US009688254B2

(12) United States Patent
Horii et al.

(10) Patent No.: US 9,688,254 B2
(45) Date of Patent: Jun. 27, 2017

(54) STOP CONTROL SYSTEM FOR VEHICLE

(71) Applicant: HONDA MOTOR CO., LTD., Tokyo (JP)

(72) Inventors: Eisuke Horii, Wako (JP); Yoshinari Sugita, Wako (JP); Shinichi Arai, Wako (JP); Syumpei Tahara, Wako (JP); Tomohiro Watanabe, Wako (JP); Hiroshi Yoneguchi, Wako (JP); Masahiko Asakura, Wako (JP); Ryuji Sato, Wako (JP); Takahiro Ohmi, Wako (JP); Hideo Takeuchi, Haga-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 14/441,853

(22) PCT Filed: Nov. 13, 2012

(86) PCT No.: PCT/JP2012/079358
§ 371 (c)(1),
(2) Date: May 11, 2015

(87) PCT Pub. No.: WO2014/076753
PCT Pub. Date: May 22, 2014

(65) Prior Publication Data
US 2015/0307069 A1 Oct. 29, 2015

(51) Int. Cl.
*B60T 7/12* (2006.01)
*B60T 8/24* (2006.01)
(Continued)

(52) U.S. Cl.
CPC ............... *B60T 7/12* (2013.01); *B60T 8/171* (2013.01); *B60T 8/245* (2013.01); *B60T 13/588* (2013.01);
(Continued)

(58) Field of Classification Search
CPC .......... B60T 7/12; B60T 13/588; B60T 8/171; B60T 8/245; B60T 13/741;
(Continued)

(56) References Cited

U.S. PATENT DOCUMENTS

2011/0080043 A1* 4/2011 Waida ................. B60L 1/003
307/9.1
2014/0012471 A1* 1/2014 Nakaso ................ B60T 7/122
701/51

FOREIGN PATENT DOCUMENTS

| JP | 8-295212 | 11/1996 |
| JP | 10-181576 | 7/1998 |

(Continued)

OTHER PUBLICATIONS

International Search Report for corresponding International Application No. PCT/JP2012/079358, Feb. 19, 2013.
(Continued)

*Primary Examiner* — Nga X Nguyen
(74) *Attorney, Agent, or Firm* — Mori & Ward, LLP

(57) ABSTRACT

A stop control system for a vehicle is provided, which is capable of stably performing cranking for restarting an internal combustion engine and positively preventing the vehicle from moving by properly increasing a braking force of the vehicle, during an idle stop. In the stop control system for a vehicle according to the present invention, the engine 3 is cranked by the starter motor 6 using the power supplied from the battery 7, when restart conditions are satisfied (step 8 in FIG. 5). Further, the stop control system includes a
(Continued)

hydraulic pump 55 driven by the power supplied from the battery 7, for increasing the braking force of the vehicle V. During a stop of the vehicle V, it is determined whether or not the braking force of the vehicle V needs to be increased (FIG. 6), and the hydraulic pump 55 is controlled according to a determination result. Further, in a case where it is determined that the braking force of the vehicle V needs to be increased, the operation of the hydraulic pump 55 is inhibited for a predetermined time period during cranking (steps 36, 37, 41 in FIG. 8).

9 Claims, 15 Drawing Sheets

(51) Int. Cl.
  *B60T 13/58* (2006.01)
  *B60T 13/74* (2006.01)
  *F02N 11/08* (2006.01)
  *B60T 8/171* (2006.01)
(52) U.S. Cl.
  CPC ........ *B60T 13/741* (2013.01); *F02N 11/0814* (2013.01); *Y02T 10/48* (2013.01)
(58) Field of Classification Search
  CPC ........... B60T 2201/06; B60T 2270/414; B60T 8/173; F02N 11/0814; Y02T 10/48; B60W 10/06; B60W 10/184; B60W 2710/182; B60W 30/18018; B60W 30/18054; B60W 30/18118; B60W 10/02; B60W 10/08; B60W 20/00; B60K 6/365; B60K 6/48
  USPC ................................................ 701/70–72, 78
  See application file for complete search history.

(56) References Cited

FOREIGN PATENT DOCUMENTS

| JP | 2004-182118 | | 7/2004 |
| JP | 2005-325692 | | 11/2005 |
| JP | 2007-168665 | | 7/2007 |
| JP | 2011-143875 | | 7/2011 |
| JP | 2011143875 A | * | 7/2011 |
| JP | 2012-071790 | | 4/2012 |
| JP | 2012-91714 | | 5/2012 |
| JP | 2012-111346 | | 6/2012 |

OTHER PUBLICATIONS

Japanese Office Action for corresponding JP Application No. 2014-546752, Mar. 29, 2016.

* cited by examiner

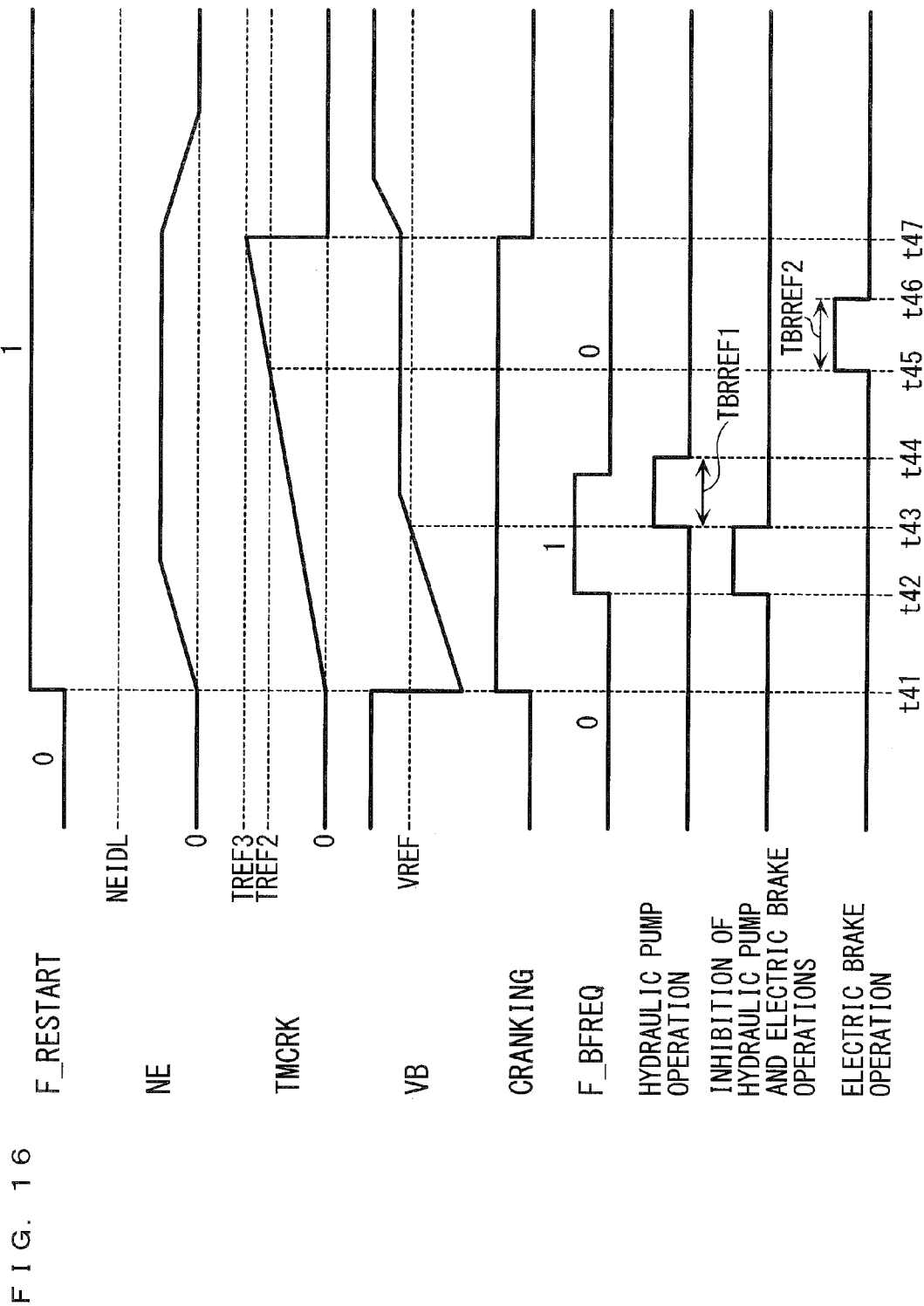

STOP CONTROL SYSTEM FOR VEHICLE

TECHNICAL FIELD

The present invention relates to a stop control system for a vehicle, which automatically stops and restarts an internal combustion engine during a stop of the vehicle, and controls the braking force of the vehicle such that it is increased.

BACKGROUND ART

Conventionally, as a stop control system for a vehicle of this type, there has been known one disclosed in PTL 1. An internal combustion engine installed on this vehicle is of a so-called idle-stop type, which is stopped when predetermined stop conditions are satisfied, and thereafter is restarted when predetermined restart conditions are satisfied. The vehicle includes a brake system for braking the vehicle during normal operation, and further includes a hydraulic pump for increasing the braking force during a stop of the vehicle.

This brake system has a master cylinder that generates a brake fluid pressure according to a stepping-on operation of a brake pedal, using negative pressure in an intake pipe, and brake units each provided for each wheel and having wheel cylinders. The brake system brakes the vehicle by supplying the brake fluid pressure generated in the master cylinder to the wheel cylinder via a hydraulic circuit. The hydraulic pump is provided in the middle of the hydraulic circuit, and is driven by a motor.

In this stop control system, when restart conditions, including e.g. release of the stepping-on of a foot brake, are satisfied during automatic stop of the engine, the engine is cranked by supplying power from a battery to a starter motor. During the cranking, power required for cranking is secured by inhibiting the operation of the hydraulic pump performed by the motor. Further, when a failure of cranking for the restart is detected and also the foot brake is stepped on, the hydraulic pump is driven by supplying power from the battery to the motor to thereby increase the brake fluid pressure in the wheel cylinder and the braking force of the vehicle, whereby the movement of the vehicle during the stop is prevented.

CITATION LIST

Patent Literature

[PTL 1]
Japanese Laid-Open Patent Publication (Kokai) No. 2011-143875

SUMMARY OF INVENTION

Technical Problem

As described above, in the conventional stop control system, the hydraulic pump is driven on condition that a failure of cranking is detected at the restart of the engine and also the foot brake is stepped on. However, even though the above two conditions are satisfied, for example, in a case where the restart conditions are satisfied immediately after the engine is automatically stopped, the actual brake fluid pressure in the wheel cylinder is sometimes sufficiently preserved. In the conventional stop control system, also in such a case, the hydraulic pump is driven, and hence power is wastefully consumed, which in turn leads to degradation of fuel economy. Further, as long as the cranking is not failed at the restart of the engine, the hydraulic pump is not driven, so that in a case where the actual brake fluid pressure in the wheel cylinder is insufficient, there is a risk that movement of the vehicle during an idle stop cannot be positively prevented.

The present invention has been made to provide a solution to the above-described problems, and an object thereof is to provide a stop control system for a vehicle, which is capable of stably cranking the engine for restart, and positively preventing the vehicle from moving by properly increasing the braking force of the vehicle during an idle stop.

Solution to Problem

To attain the above object, an embodiment of the invention is a stop control system for a vehicle, for stopping an internal combustion engine 3 installed on the vehicle V having a brake system 5, when predetermined stop conditions are satisfied, restarting the engine 3 when predetermined restart conditions are satisfied, and controlling a braking force of the vehicle V such that the braking force is increased in order to supplement the braking force of the brake system 5 during a stop of the vehicle, comprising cranking means (start motor 6) for cranking the engine 3 using power supplied from a predetermined power source (battery 7 in embodiments (the same applies hereinafter in this section) when the restart conditions are satisfied, a braking force-increasing device (hydraulic pump 55, electric brake 20) that is driven by power supplied from the power source, for increasing the braking force of the vehicle V, braking force increasing necessity-determining means (ECU 2, FIG. 6) for determining whether or not the braking force of the vehicle V needs to be increased by the braking force-increasing device during a stop of the vehicle V, and control means (ECU 2) for controlling the braking force-increasing device according to a determination result by the braking force increasing necessity-determining means, wherein in a case where it is determined that the braking force of the vehicle V needs to be increased, the control means inhibits an operation of the braking force-increasing device for a predetermined time period during cranking performed by the cranking means (steps 36, 37, 41 in FIG. 8).

The engine is installed on the vehicle, and is of a so-called idle-stop type that is automatically stopped when predetermined stop conditions are satisfied, and is thereafter automatically restarted when predetermined restart conditions are satisfied. When the above-mentioned restart conditions are satisfied, the engine is cranked by the cranking means using power supplied from the predetermined power source, so as to restart the engine.

Further, the stop control system according to the present invention includes a braking force-increasing device that is driven by power supplied from the power source which is common to the cranking means and determines whether or not the braking force of the vehicle needs to be increased by the braking force-increasing device during a stop of the vehicle, and the braking force-increasing device is controlled according to the determination result. Further, in a case where it is determined that the braking force of the vehicle needs to be increased, the operation of the braking force-increasing device is inhibited for a predetermined time period during cranking performed by the cranking means.

As described above, even in a case where it is determined that the braking force needs to be increased by the braking force-increasing device, the operation of the braking force-increasing device is inhibited for a predetermined time period during cranking, whereby the cranking is preferentially performed. This makes it possible to prevent the voltage from being lowered due to the operation of the braking force-increasing device, and secure the power required for the cranking. Therefore, it is possible to stably and excellently crank and restart the engine. For the same reason, it is possible to properly increase the braking force of the vehicle while avoiding malfunction or failure of the braking force-increasing device which might be caused by a power shortage in a state where the voltage of the power source is lowered due to the cranking, to thereby positively prevent the vehicle from moving during an idle stop. Further, only in a case where it is determined that the braking force of the vehicle needs to be increased, the braking force-increasing device is activated, so that it is possible to efficiently operate the braking force-increasing device without wasting the power.

In an embodiment of the invention, the control means inhibits the operation of the braking force-increasing device until the cranking is terminated, and causes the braking force-increasing device to operate when the cranking is terminated (steps 37, 48 in FIG. 8).

With this configuration, since the operation of the braking force-increasing device is inhibited throughout the cranking of the engine, it is possible to further stably and excellently crank and restart the engine without the voltage of the power source being lowered by the operation of the braking force-increasing device. Further, thereafter, the braking force-increasing device is activated when the cranking is terminated, and hence it is possible to excellently operate the braking force-increasing device while positively avoiding malfunction or failure of the braking force-increasing device which might be caused by lowering of the voltage of the power source due to the cranking.

An embodiment of the invention further comprises cranking time period-acquiring means (ECU 2) for acquiring a time period TMCRK of cranking performed by the cranking means, and the control means inhibits the operation of the braking force-increasing device until the acquired time period TMCRK of cranking reaches a first predetermined time period TREF1, and causes the braking force-increasing device to operate when the time period of cranking reaches the first predetermined time period TREF1 (steps 36, 37, 41 in FIG. 8).

With this configuration, until the first predetermined time period elapses after starting the cranking, the operation of the braking force-increasing device is inhibited, and hence it is possible to stably crank and restart the engine while preventing the voltage of the power source from being lowered due to the operation of the braking force-increasing device. Further, when the time period of cranking has reached the first predetermined time period, the braking force-increasing device is activated, so that it is possible to increase the braking force of the vehicle as quickly as possible, and thereby positively prevent the vehicle from moving during an idle stop.

An embodiment of the invention further comprises voltage acquisition means (voltage sensor 68) for acquiring a voltage of the power source (battery voltage VB), and the control means inhibits the operation of the braking force-increasing device until the voltage of the power source acquired during the cranking becomes not lower than a predetermined voltage VREF, and causes the braking force-increasing device to operate when the voltage of the power source becomes not lower than the predetermined voltage VREF (steps 36A, 37, 41 in FIG. 11).

In a case where the cranking is performed using the power supplied from the power source, generally, the voltage of the power source has a characteristic that it significantly lowers immediately after starting the cranking, then gradually rises, and recovers. With the above configuration, after starting the cranking, the operation of the braking force-increasing device is inhibited until the acquired voltage of the power source becomes not lower than a predetermined voltage, and hence it is possible to stably crank and restart the engine while preventing the voltage of the power source from being lowered due to the operation of the braking force-increasing device. Further, thereafter, when the voltage of the power source becomes not lower than the predetermined voltage, the braking force-increasing device is activated, and hence it is possible to excellently operate the braking force-increasing device in a state where the voltage of the power source is actually and sufficiently recovered.

In an embodiment of the invention, the control means stops the braking force-increasing device when a predetermined time period TBRREF elapses after starting the operation of the braking force-increasing device (steps 42, 43, 49, 50 in FIG. 8).

With this configuration, the braking force-increasing device is operated for the predetermined time period, whereby the operation time thereof is sufficiently secured. Therefore, it is possible to positively increase the braking force of the vehicle.

An embodiment of the invention further comprises road surface slope-detecting means (acceleration sensor 67) for detecting a slope ASLP of a road surface on which the vehicle V is stopped, and predetermined time period-setting means (ECU 2) for setting the predetermined time period TBRREF according to the detected slope ASLP of the road surface.

The mobility of the vehicle during an idle stop is different depending on the slope of a road surface on which the vehicle is stopped. As the slope of the road surface is larger, the mobility of the vehicle becomes higher. With the above configuration, a predetermined time period that determines an actual operation time period of the braking force-increasing device is set according to the detected slope of the road surface. Therefore, it is possible to operate the braking force-increasing device for an appropriate time period according to the mobility of the vehicle dependent on the slope of the road surface.

In an embodiment of the invention, the braking force-increasing device includes a first braking force-increasing device (hydraulic pump 55) and a second braking force-increasing device (electric brake 20), and wherein the control means causes the first braking force-increasing device to operate when the time period of cranking reaches a first predetermined time period TREF1, and thereafter, causes the second braking force-increasing device to operate when the time period of cranking reaches a second predetermined time period TREF2 that is not less than the first predetermined time period TREF1 (steps 61, 63, 67, 74 in FIG. 13).

With this configuration, when the first predetermined time period has elapsed after starting the cranking from the idle stop state, first, the first braking force-increasing device is activated, and thereafter, when the second predetermined time period has elapsed after starting the cranking, the second braking force-increasing device is activated, whereby the braking force of the vehicle is increased in a stepwise manner. Therefore, it is possible to efficiently and strongly brake the vehicle, and positively prevent the vehicle from moving during an idle stop.

An embodiment of the invention further comprises cranking time period-acquiring means (ECU 2) for acquiring a time period TMCRK of cranking performed by the cranking means, and wherein the braking force-increasing device (hydraulic pump 55) includes a first braking force-increasing device (hydraulic pump 55) and a second braking force-increasing device (electric brake 20), and wherein the control means causes the first braking force-increasing device to operate when the voltage of the power source becomes not lower than the predetermined voltage VREF, and thereafter, causes the second braking force-increasing device to operate when the acquired time period TMCRK of cranking reaches a predetermined time period (second predetermined time period TREF2) (steps 61A, 63, 67, 74 in FIG. 15).

With this configuration, after starting the cranking, the first braking force-increasing device is activated when the voltage of the power source becomes not lower than the predetermined voltage, and hence it is possible to excellently operate the first braking force-increasing device in a state where the voltage of the power source is actually and sufficiently recovered. Further, thereafter, when the second predetermined time period elapsed after start of the cranking, the second braking force-increasing device is activated, and hence it is possible to further increase the braking force of the vehicle, more strongly brake the vehicle, and positively prevent the vehicle from moving during an idle stop.

In an embodiment of the invention, the first braking force-increasing device has a characteristic that a response time period from supply of power to generation of the braking force is shorter than that of the second braking force-increasing device.

With this configuration, out of the first and second braking force-increasing devices, the first braking force-increasing device that has a higher characteristic of response from supply of power to generation of the braking force. Therefore, it is possible to positively prevent the vehicle from moving during an idle stop by more quickly increasing the braking force.

In an embodiment of the invention, the brake system 5 is configured to brake the vehicle V by brake fluid pressure that is supplied to a wheel cylinder 16, the stop control system further comprising wheel cylinder pressure-detecting means (wheel cylinder pressure sensor 62) for detecting the brake fluid pressure (wheel cylinder pressure PWC) in the wheel cylinder 16, and wherein the braking force increasing necessity-determining means determines that the braking force needs to be increased by the braking force-increasing device when the detected brake fluid pressure in the wheel cylinder 16 has lowered to not higher than a predetermined pressure PREF or lower (steps 24, 25 in FIG. 6).

With this configuration, the brake system is configured to brake the vehicle by the brake fluid pressure that is supplied to the wheel cylinder, and it is determined that the braking force needs to be increased by the braking force-increasing device when the detected brake fluid pressure in the wheel cylinder has lowered to not higher than a predetermined pressure. This makes it possible to properly operate the braking force-increasing device according to the actual lowered state of the brake fluid pressure in the wheel cylinder that drives the brake system, and efficiently obtain a required braking force.

In an embodiment of the invention, the control means stops the braking force-increasing device when the brake fluid pressure in the wheel cylinder exceeds the predetermined pressure PREF after activating the braking force-increasing device.

With this configuration, after activating the braking force-increasing device, it is possible to stop the braking force-increasing device in a state where the brake fluid pressure has actually and sufficiently recovered, and therefore, it is possible to positively increase the braking force of the vehicle, and efficiently operate the braking force-increasing device.

An embodiment of the invention further comprises road surface slope-detecting means (acceleration sensor 67) for detecting a slope ASLP of a road surface on which the vehicle V is stopped, and predetermined pressure-setting means (ECU 2, step 23 in FIG. 6, FIG. 7) for setting the predetermined pressure PREF according to the detected slope ASLP of the road surface.

As described hereinabove, the mobility of the vehicle during an idle stop is different depending on the slope of the road surface on which the vehicle is stopped. With the above-described configuration, according to the detected slope of the road surface, the predetermined pressure for determining whether or not the braking force-increasing device can be activated or stopped is set. Therefore, it is possible to properly control the activation or stoppage of the braking force-increasing device, based on a result of comparison between the brake fluid pressure in the wheel cylinder and the set predetermined pressure, according to the mobility of the vehicle.

An embodiment of the invention further comprises vehicle speed-detecting means (wheel speed sensor 64) for detecting a speed of the vehicle (vehicle speed VP), and wherein the braking force increasing necessity-determining means determines that the braking force needs to be increased by the braking force-increasing device, when the detected speed of the vehicle is not equal to 0 (steps 26, 25 in FIG. 6).

With this configuration, it is determined that the braking force needs to be increased by the braking force-increasing device when the detected speed of the vehicle is not equal to 0, and hence it is possible to operate the braking force-increasing device according to even slight movement of the vehicle, and more positively prevent the vehicle from further moving. Further, since the vehicle speed-detecting means is normally provided for controlling the vehicle or the engine, it is possible to obtain the above-described advantageous effects using such an existing device without causing an increase in the manufacturing costs.

BRIEF DESCRIPTION OF DRAWINGS

FIG. 16 A timing diagram showing an operation example obtained by the FIG. 15 process.

DESCRIPTION OF EMBODIMENTS

Figure 1:
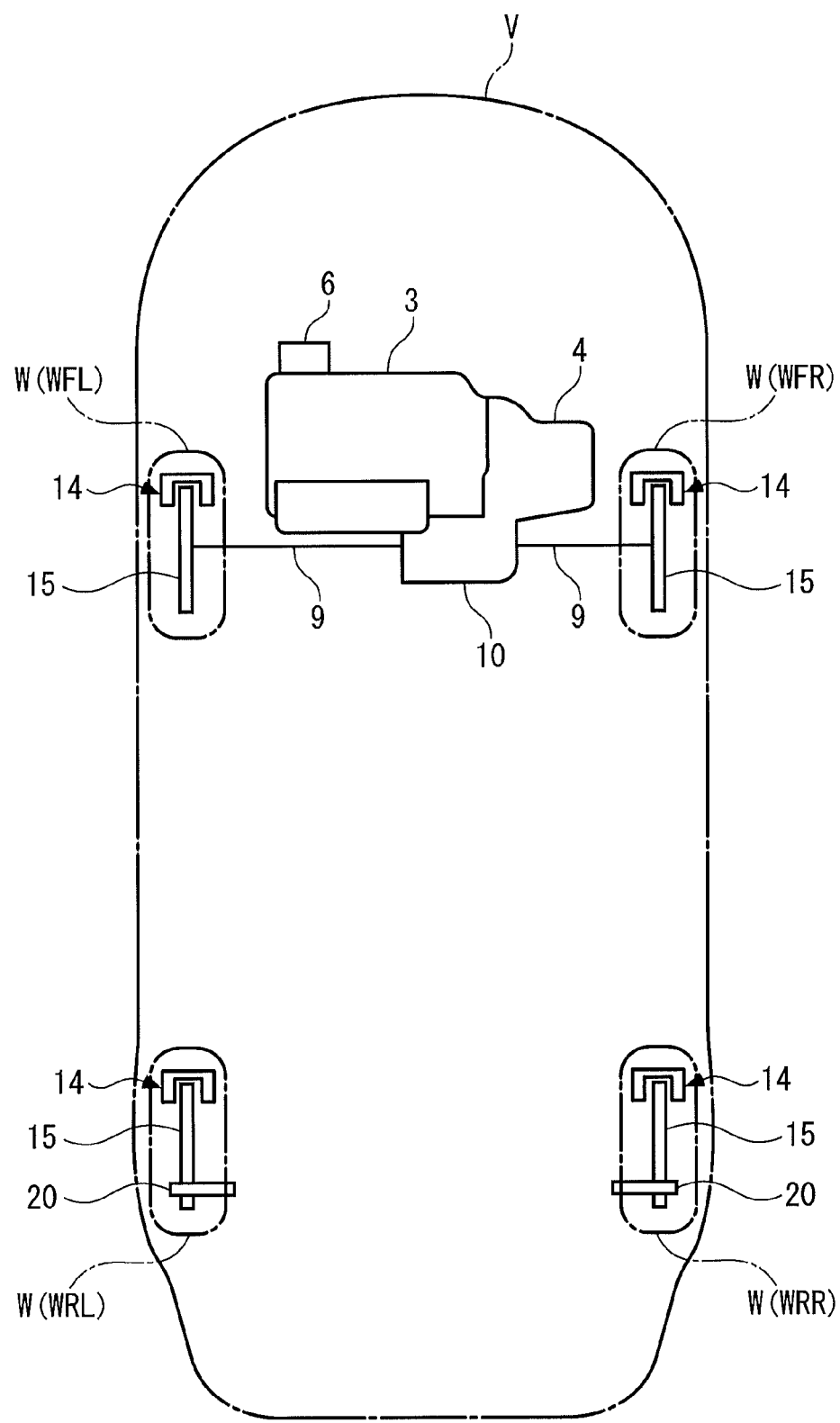
FIG. 1 A diagram schematically showing a vehicle to which the present invention is applied.

The invention will now be described in detail with reference to the drawings showing preferred embodiments thereof. FIG. 1 schematically shows a vehicle V to which the present invention is applied. As shown in the FIG. 1, the vehicle V is a four-wheel vehicle of front-wheel drive type, which has left and right front wheels WFL and WFR and left and right rear wheels WRL and WRR (hereinafter referred to as "the wheels W", when generically referred to), and includes an internal combustion engine (hereinafter referred to as "the engine") 3 installed on the front part of the vehicle V, an automatic transmission 4 for changing speed of power from the engine 3, and a brake system 5 (see FIG. 3) for braking the vehicle V.

The engine 3 is a gasoline engine that performs, as described hereinafter, a so-called idle-stop for automatically stopping the engine 3 when predetermined stop conditions are satisfied and automatically restarting the same when predetermined restart conditions are satisfied. Further, the restart of the engine 3 is performed by driving a starter motor 6 using power supplied from a battery 7 (see FIG. 4) to thereby rotate (crank) the crankshaft (not shown), and injecting fuel from fuel injection valves 8.

The automatic transmission 4 is comprised of a torque converter that is connected to the crankshaft of the engine 3, a shift lever with which one of eight shift positions of 1, 2, 3, D4, D5, N, R, and P can be selected, and a gear mechanism with which it is possible to switch between one of six speed positions of first to fifth speeds and reverse can be switched (none of which are shown). An output shaft (not shown) of the torque converter of the automatic transmission 4 is connected to the left and right front wheels WFL and WFR via a final reduction gear unit 10 and drive shafts 9 and 9, whereby the power of the engine 3 is transmitted to the front wheels WFL and WFR.

Figure 3:
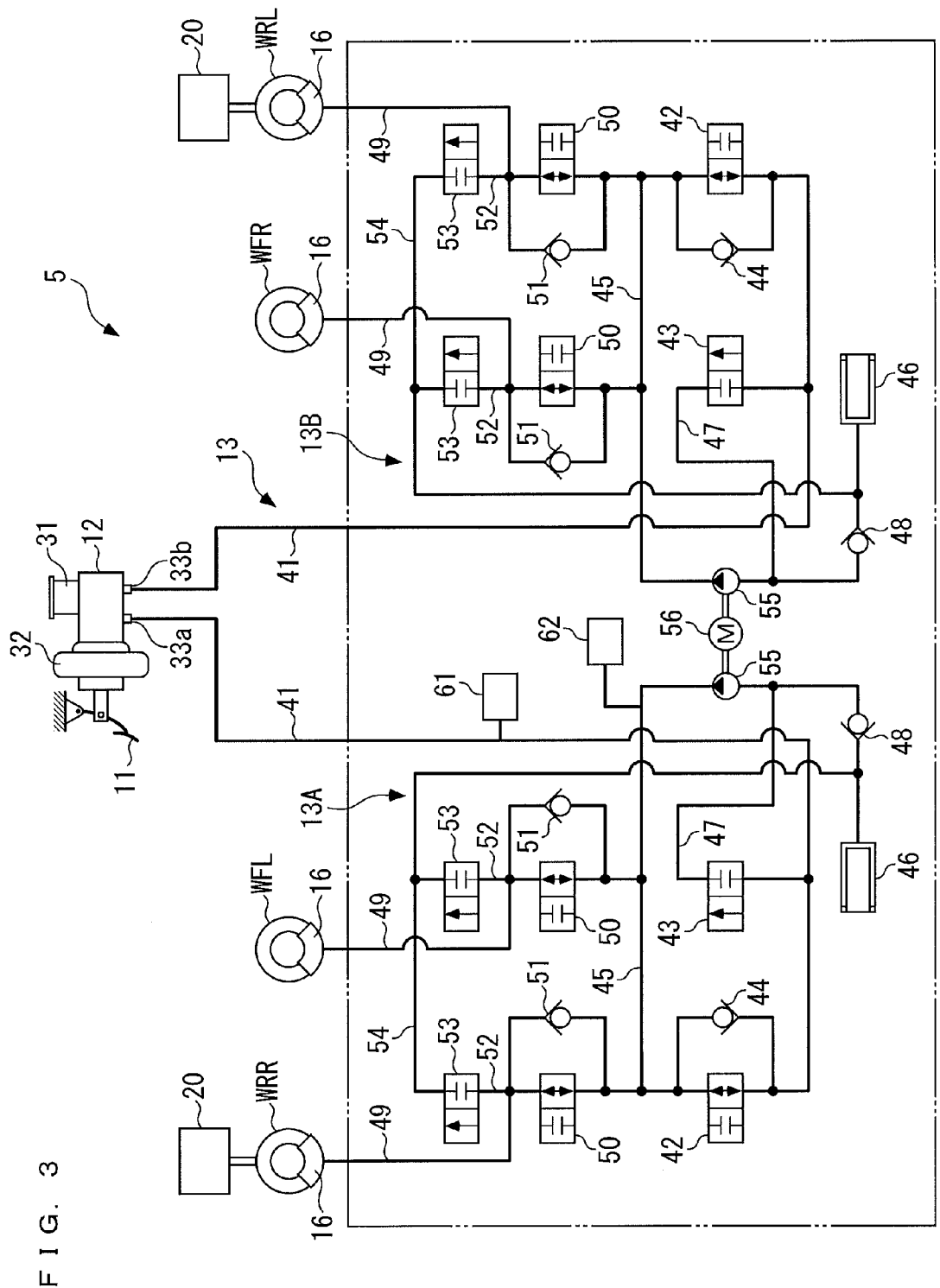
FIG. 3 A circuit diagram showing a configuration of a brake system.

As shown in FIG. 3, the brake system 5 is of a hydraulic type using brake fluid such as hydraulic oil, and is comprised of a brake pedal 11, a master cylinder 12, a hydraulic circuit 13, and a disc brake 14 provided for each wheel W. The disc brake 14 includes a disc 15 (see FIG. 1) integrally formed with the wheel W, a pair of movable brake pads (not shown) disposed on both sides of the disc 15, a piston (not shown) for driving the brake pads, and a wheel cylinder 16. When the brake pedal 11 is stepped on by a driver of the vehicle V, by supplying the brake fluid pressure generated in the master cylinder 12 to the wheel cylinder 16 via the brake circuit 13, the brake pads are driven to hold the disc 15 therebetween, whereby the vehicle V is braked. A detailed description of the configuration and operation of the brake system 5 will be given hereinafter.

Figure 2:
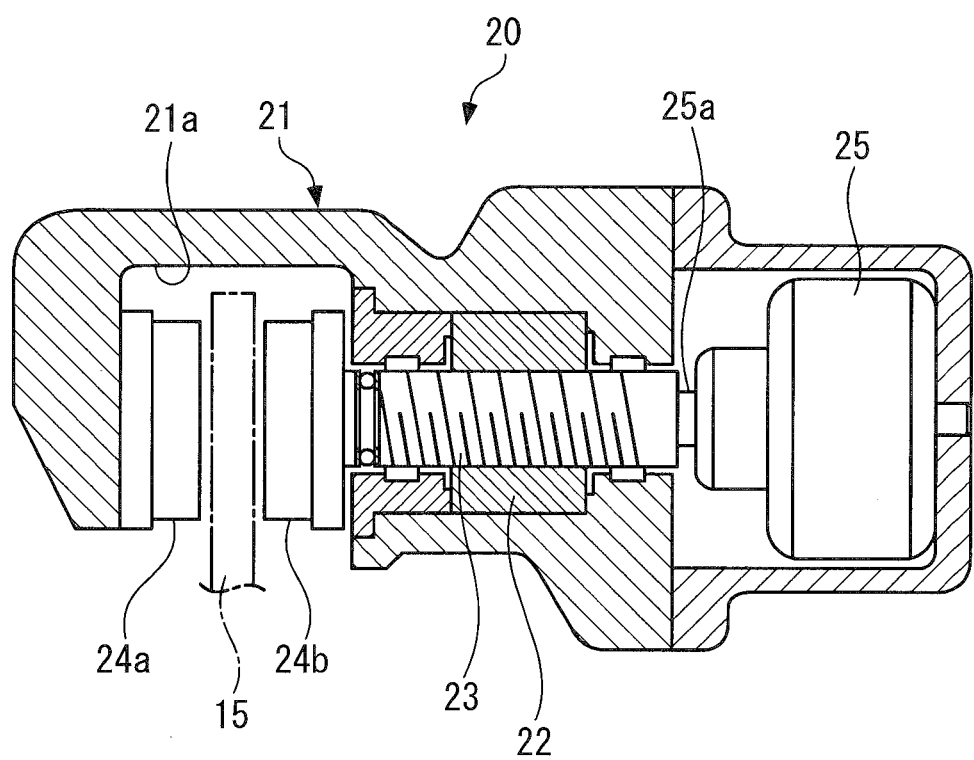
FIG. 2 A cross-sectional view showing a schematic configuration of an electric brake.

Further, the left and right rear wheels WRL and WRR are provided with respective electric brakes 20 separately from the above-described brake system 5. As shown in FIG. 2, the electric brake 20 includes a caliper body 21 integrally formed with a body (not shown) of the vehicle V, a nut 22 fixed in the caliper body 21, a screw 23 screwed in the nut 22 and movable in the axial direction, a pair of brake pads 24a and 24b housed in a recess 21a of the caliper body 21, and a brake motor 25 having a rotating shaft 25a being connected to one end of the screw 23. One brake pad 24a is secured to the wall surface of the recess 21a, the other brake ad 24b is attached to the other end of the screw 23, and the disc 15 of the disc brake 14 is disposed between the brake pads 24a and 24b.

With the above-described configuration, when the brake motor 25 performs normal rotation, the screw 23 is moved toward the disc 15 while rotating, whereby the brake pad 24b is moved together therewith to hold the disc 15 with the brake pad 24a, whereby the rear wheels WRL and WRR are braked. When the brake motor 25 performs reverse rotation from this state, by action reverse to the above, the brake pad 24b is moved toward the brake motor 25 to leave the disc 15, whereby the braking of the rear wheels WRL and WRR is released. Such operations of the electric brake 20 are performed according to the operating state of an electric brake switch (not shown) provided in the driver's seat of the vehicle V, and are controlled by a control signal from an ECU 2, described hereinafter.

Next, referring to FIG. 3, the configuration of the above-described brake system 5 will be described in detail. The master cylinders 12 of the brake system 5 are of a tandem type, each having two hydraulic chambers and pistons (none of which are shown). The brake fluid is supplied from a reservoir 31 to each hydraulic chamber, and one piston is connected to the brake pedal 11. Further, a brake booster 32 is provided between the brake pedal 11 and the master cylinder 12. The brake booster 32 generates an assist force that acts on the piston using negative pressure generated in the intake pipe during operation of the engine 3, to thereby assist the operating force of the brake pedal 11.

When the brake pedal 11 is operated, two pistons are moved to pressurize the brake fluid in each hydraulic chamber, whereby the brake fluid pressure is generated according to the operating force of the brake pedal 11 assisted by the brake booster 32, and is output from a first output port 33a and a second output port 33b that are communicated with respective hydraulic chambers.

The hydraulic circuit 13 of the brake system 5 is comprised of a first hydraulic circuit 13A that is linked between the first output port 33a and the wheel cylinders 16 and 16 of the left front wheel WFL and the right rear wheel WRR, and a second hydraulic circuit 13B that is linked between the second output port 33b and the wheel cylinders 16 and 16 of the right front wheel WFR and the left rear wheel WRL.

These two-system hydraulic circuits 13A and 13B have the same configuration with each other, and hence the following description is given of the first hydraulic circuit 13A, byway of example. Further, in the following description, when "upstream" is mentioned concerning various fluid lines described hereinafter, it means a side toward the master cylinder 12 and when "downstream" is mentioned concerning the same, it means a side toward the wheel cylinder 16.

A first fluid line 41 is connected to the first output port 33a of the master cylinder 12. A first control valve 42 and a second control valve 43 for VSA (Vehicle Stability Assist) are disposed in parallel with each other at respective locations downstream of the first fluid line 41, and further, the first control valve 42 is provided with a check valve 44 disposed in parallel therewith.

The first control valve 42 is formed by a normally-open solenoid valve that allows bidirectional flow of the brake fluid, and is connected to the reservoir 46 downstream thereof via a second fluid line 45. The check valve 44 is so disposed as to allow flow of the brake fluid from upstream to downstream of the first control valve 42.

The second control valve 43 is formed by a normally-closed solenoid valve that allows flow of the brake fluid only from upstream thereof, and is connected downstream to the second fluid line 45 via a third fluid line 47. Further, the second fluid line 45 is provided with a check valve 48 at a location closer to a reservoir 46 than to a portion thereof connected to the third fluid line 47, which allows flow of the brake fluid from the reservoir 46.

Two fourth fluid lines 49 and 49 are connected to the above-described second fluid line 45 in parallel with each other, and these fourth fluid lines 49 and 49 are connected to the wheel cylinders 16 and 16 of the left front wheel WFL and the right rear wheel WRR, respectively. Each fourth fluid line 49 is provided with an inflow valve 50 and a check valve 51 that are disposed in parallel with each other. The inflow valve 50 is formed by a normally-open solenoid valve that allows bidirectional flow of the brake fluid. Further, the check valve 51 is so disposed as to allow flow of the brake fluid from downstream to upstream of the inflow valve 50.

Further, a fifth fluid line 52 branches from a portion of each fourth fluid line 49, which is downstream of the inflow valve 50, and each fifth fluid line 52 is provided with an outflow valve 53. The outflow valve 53 is formed by a normally-closed solenoid valve that allows flow of the brake fluid only from the inflow valve 50. The fifth fluid lines 52 and 52 join a sixth fluid line 54, and the sixth fluid line 54 is connected to a portion of the second fluid line 45, which is closer to the reservoir 46 than to the check valve 48.

The second fluid line 45 is provided with a hydraulic pump 55 at a location remoter from the reservoir 46 than the portion thereof connected to the third fluid line 47 is, and the hydraulic pump 55 is connected to a hydraulic motor 56. The hydraulic motor 56 is driven by power supplied from the battery 7 based on a drive signal from the ECU 2, whereby the hydraulic pump 55 is driven.

Next, a basic operation of the brake system 5 configured as above will be described. In a state in which the vehicle V and the engine 3 are normally operate, the brake system 5 is controlled to a normal operation mode shown in FIG. 3. That is, all the first control valves 42, second control valves 43, inflow valves 50, and outflow valves 53 of the brake system 5 are controlled to a non-excited state, and the hydraulic motor 56 and the hydraulic pump 55 are at rest.

In this normal operation mode, when the brake pedal 11 is stepped on, a brake fluid pressure (master cylinder pressure PMC) that is pressurized according to the sum of the operating force of the brake pedal 11 and the assist force of the brake booster 32 is generated in the master cylinder 12. This brake fluid pressure is output from the first and second output ports 33a and 33b to each first fluid line 41 of the first and second hydraulic circuits 13A and 13B, and is supplied to the wheel cylinder 16 of each wheel W further via the first control valve 42, the inflow valve 50, and the fourth fluid line 49. Thus, the disc brake 14 of each wheel W is operated to brake the vehicle V with the braking force commensurate with a wheel cylinder pressure PWC.

Further, to increase the braking force of the vehicle V, from the controlled state in the normal mode, the first control valve 42 is excited to be closed, the second control valve 43 is excited to be opened, and the hydraulic motor 56 is driven to operate the hydraulic pump 55 (pressurization mode). In this pressurization mode, the brake fluid is pumped by the hydraulic pump 55 from the reservoir 46 and is pressurized, and the pressurized brake fluid is supplied to the wheel cylinder 16 via the second fluid line 45, the inflow valve 50, and the fourth fluid line 49. This increases the wheel cylinder pressure PWC, whereby the braking force of the vehicle V is increased.

Further, after the above-described pressurization mode and the like, to retain the braking force of the vehicle V, from the controlled state in the pressurization mode, the second control valve 43 is changed into a non-excited state to cause the same to be closed (retention mode). In this retention mode, the first fluid line 41 communicating with the master cylinder 12 is closed by the first control valve 42, and the brake fluid returning from the second fluid line 45 to the reservoir 46 is blocked by the check valve 48 so that outflow of the brake fluid from the wheel cylinder 16 is prevented. This retains the wheel cylinder pressure PWC and the braking force of the vehicle V. Note that the retention mode is released at the standing start of the vehicle V, and the brake system 5 returns to the above-described normal operation mode.

As described above, the hydraulic pump 55 is configured to be driven by the hydraulic motor 56 to transmit the pressurized brake fluid pressure to thereby increase the braking force of the vehicle V. On the other hand, the above-described electric brake 20 is configured to rotate and move the screw 23 by the brake motor 25 to thereby obtain the braking force. Therefore, when a comparison is made between the two, in the response time from the start of the power supply to the motor (the hydraulic motor 56 or the brake motor 25) to the actual generation of the braking force, the hydraulic pump 55 is shorter than the electric brake 20, that is, the hydraulic pump 55 has a higher responsiveness than the electric brake 20.

Further, to perform various controls including control of the above-described brake system 5, sensors for detecting operating conditions of the vehicle V and the engine 3 are provided as follows: First, the first fluid line 41 is provided with a master cylinder pressure sensor 61 for detecting the master cylinder pressure PMC and the second fluid line 45 is provided with a wheel cylinder pressure sensor 62 for detecting the wheel cylinder pressure PWC, to deliver signals indicative of respective detections to the ECU 2 (see FIG. 4).

Figure 4:
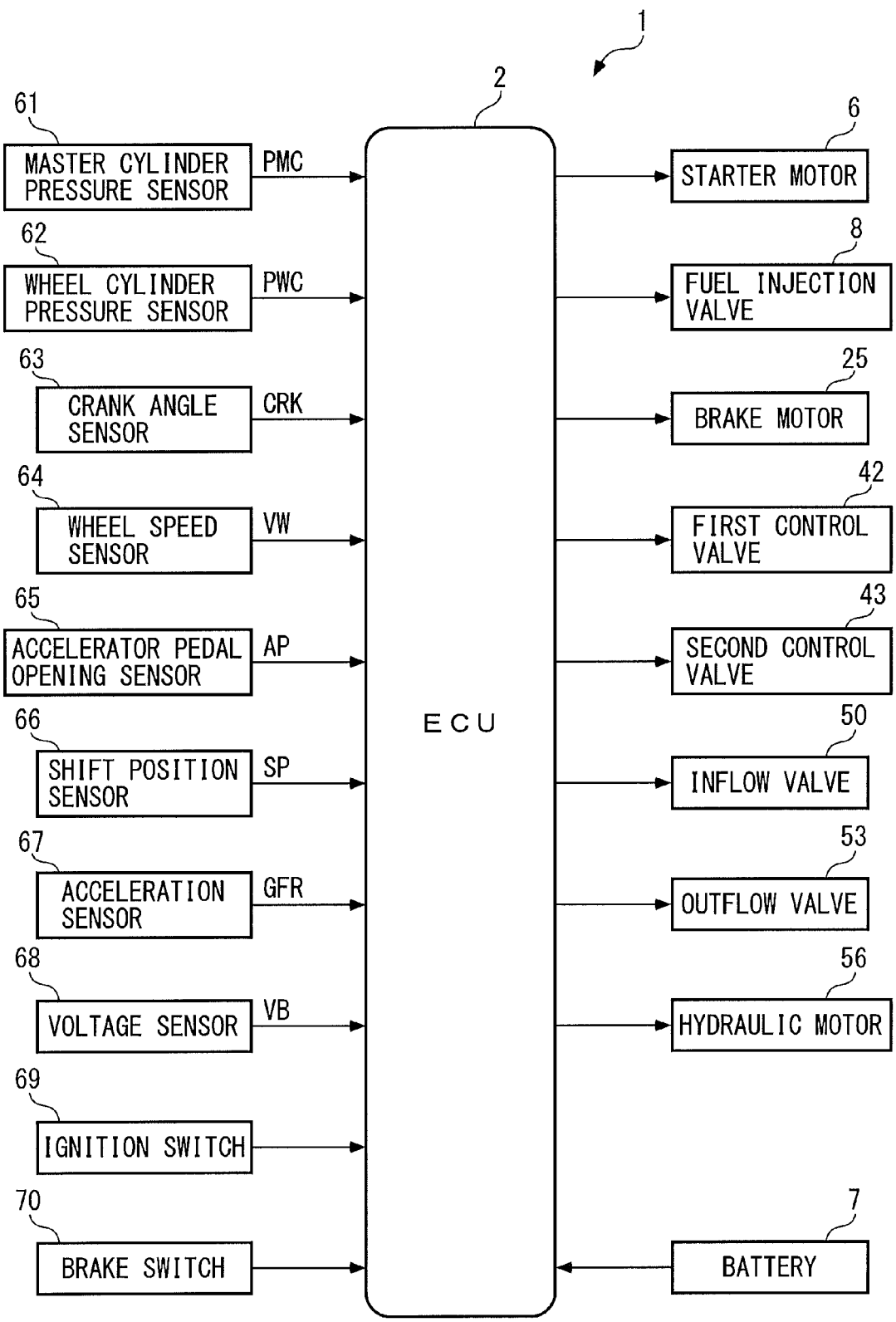
FIG. 4 A block diagram showing a stop control system for a vehicle.

Further, as shown in FIG. 4, a CRK signal indicative of the rotational speed of the crankshaft of the engine 3 from a crank angle sensor 63, and a VW signal indicative of the rotational speed of each wheel W from a wheel speed sensor 64 are input to the ECU 2. The ECU 2 calculates a rotational speed of the engine 3 (hereinafter referred to as "the engine speed NE") based on the CRK signal, and a vehicle speed VP that is the speed of the vehicle V, based on the VW signal.

Further, input to the ECU 2 are a detection signal indicative of an accelerator pedal opening degree AP of the accelerator pedal (not shown) (hereinafter referred to as "the accelerator pedal opening AP") from an accelerator pedal opening sensor 65, a detection signal indicative of a shift position SP of the shift lever from a shift position sensor 66, and a detection signal indicative of a forward-rearward acceleration GFR of the vehicle V from an acceleration sensor 67.

Further, a detection signal indicative of a voltage VB of the battery 7 (hereinafter referred to as "the battery voltage VB") is input from a voltage sensor 68 to the ECU 2. The ECU 2 calculates a remaining charge amount SOC of the battery 7 (hereinafter referred to as "the battery remaining charge SOC") based on this detection signal and so forth.

Further, from an ignition switch 69, a detection signal indicative of an on/off state of the same, and from a brake switch 70, a detection signal indicative of an on/off state of the same, are input to the ECU 2.

The ECU 2 is implemented by a microcomputer comprised of a CPU, a RAM, a ROM, and an input interface (none of which are shown). The ECU 2 determines the operating conditions of the engine 3 and the vehicle V based on a control program stored in the ROM or the like according to the detection signals from the above-mentioned various sensors 61 to 68 and switches 69 and 70, and performs various control processes including control of the braking force of the engine 3 and the vehicle V, based on results of the determination.

More specifically, the ECU 2 controls the starter motor 6 and the fuel injection valve 8 to thereby perform idle stop control of the engine 3. Further, the ECU 2 controls excitation/non-excitation of the first control valve 42, the second control valve 43, the inflow valve 50, and the outflow valve 53, each formed by an electromagnetic valve, of the brake system 5, separately, and performs control of the braking force of the vehicle V by controlling the hydraulic pump 55 and the electric brake 20 via the hydraulic motor 56 and the brake motor 25, respectively.

In the present embodiment, the ECU 2 corresponds to braking force increasing necessity-determining means, control means, cranking time period-acquiring means, predetermined time period-setting means, and predetermined pressure-setting means. Further, the hydraulic pump 55 that is driven by the hydraulic motor 56 corresponds to a first braking force-increasing device, and the electric brake 20 that is driven by the brake motor 25 corresponds to a second braking force-increasing device.

Figure 5:
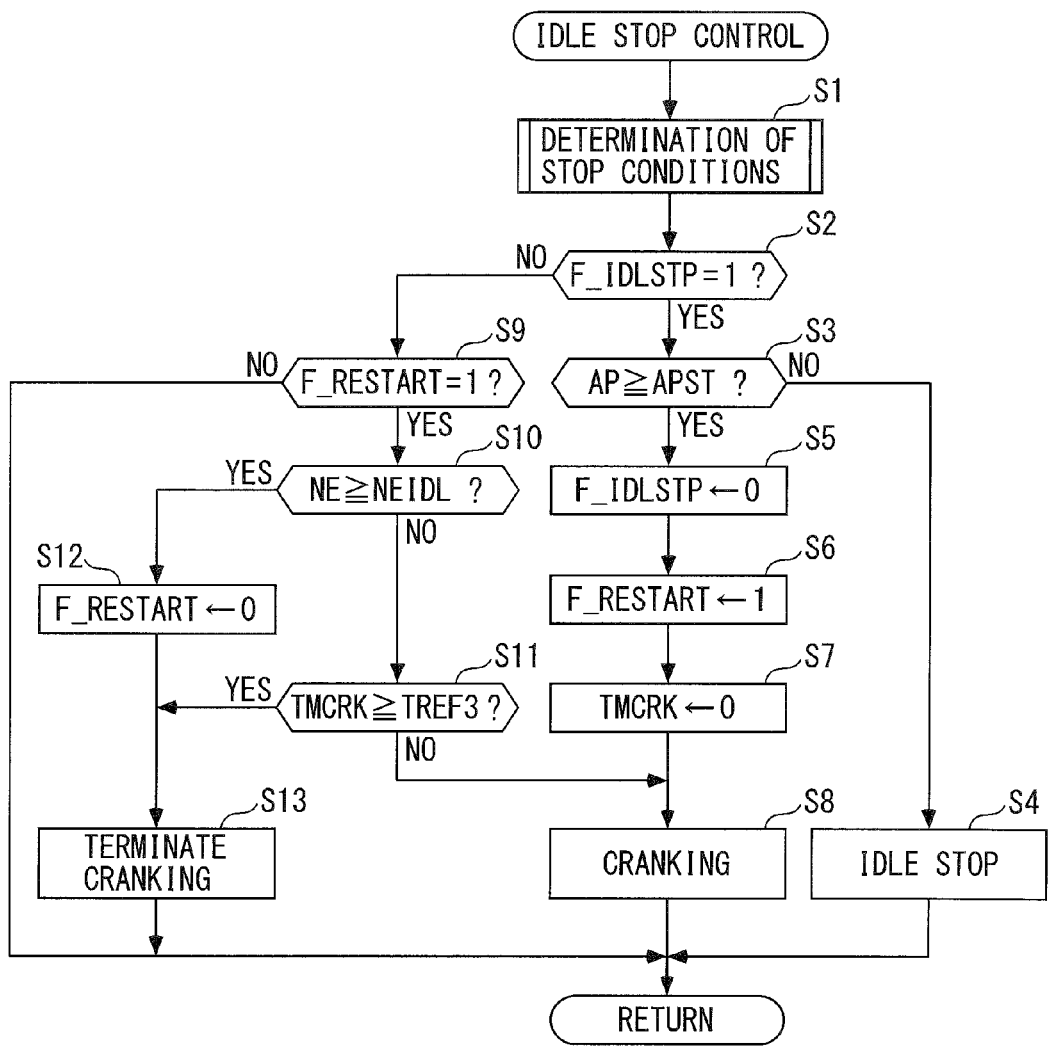
FIG. 5 A flowchart of an idle stop control process.

Next, control processes performed by the ECU 2 will be described with reference to FIGS. 5 to 16. The idle stop control process shown in FIG. 5 is for controlling the idle stop and subsequent restart of the engine 3, and is performed at predetermined time intervals.

In the present process, first, in a step 1 (shown as S1; the following steps are also similarly shown), it is determined whether or not the predetermined stop conditions of the engine 3 are satisfied. The stop conditions are a plurality of conditions (a) to (g) described below:

(a) the ignition switch 69 is in the on state;
(b) the engine speed NE is not lower than a predetermined value;
(c) the vehicle speed VP is not higher than a predetermined value;
(d) the accelerator pedal opening AP is approximately equal to 0;
(e) the shift position SP is at a position other than P, R, and N;
(f) the brake switch 70 is in the on state; and
(g) the battery remaining charge SOC is not less than a predetermined value.

If all these conditions (a) to (g) are satisfied, it is determined that the stop conditions are satisfied, and an idle-stop flag F_IDLSTP is set to 1. On the other hand, if any one of these conditions (a) to (g) is not satisfied, it is determined that the stop conditions are not satisfied, and the idle-stop flag F_IDLSTP is set to 0.

Next, in a step 2, it is determined whether or not the above idle-stop flag F_IDLSTP is equal to 1. If the answer to the question of the step 2 is affirmative (YES), it is determined whether or not the accelerator pedal opening AP is not smaller than a predetermined restart determining opening degree APST (step 3). If the answer to the question of the step 3 is negative (NO), injection of fuel from the fuel injection valves 8 is stopped to control the engine 3 to an operation stop state, whereby the idle stop is performed (step 4).

On the other hand, if the answer to the question of the step 3 is affirmative (YES), i.e. when the accelerator pedal is stepped on during an idle stop and thereby makes the accelerator pedal opening AP not smaller than the restart determining opening degree APST, it is determined that the restart conditions of the engine 3 are satisfied, and hence an idle-stop flag F_IDLSTP is reset to 0 (step 5), a restart flag F_RESTART is set to 1 (step 6), and a cranking time period TMCRK that is counted with a timer of an up-count type is reset to 0 (step 7). Then, the cranking is started to restart the engine 3 (step 8), followed by terminating the present process.

After starting the cranking as described above, the answer to the question of the step 2 becomes negative (NO), and in this case, the process proceeds to a step 9, wherein it is determined whether or not the restart flag F_RESTART is equal to 1. After the start of the cranking, the answer to the question of the step 9 becomes affirmative (YES), and in this case, it is determined whether or not the engine speed NE is not lower than a predetermined idle engine speed NEIDL (step 10), and it is determined whether or not the cranking time period TMCRK is not less than a third predetermined time period TREF3 (step 11). If these answers to the questions of the steps 10 and 11 are both negative (NO), the present process proceeds to the step 8 to continue the cranking.

On the other hand, if the answer to the question of the step 10 is affirmative (YES), it is determined that the engine speed NE is made not lower than the idle engine speed NEIDL by the cranking to complete the restart of the engine 3. Then, the restart flag F_RESTART is reset to 0 (step 12), and the cranking is terminated (step 13), followed by terminating the present process.

Further, if the answer to the question of the step 11 is affirmative (YES), i.e. TMCRK≥TREF3, in other words, if the third predetermined time period TREF3 has elapsed after the start of the cranking without the engine speed NE being increased to the idle engine speed NEIDL, it is determined that a start failure has occurred, and the process proceeds to the step 13 to terminate the cranking. Further, if the answer to the question of the step 9 is negative (NO), i.e. if the engine 3 is neither during an idle stop nor during restarting, the present process is immediately terminated.

Next, a braking force-increasing necessity determination process for the vehicle V will be described with reference to FIG. 6. This process determines whether or not the braking force needs to be increased e.g. by the operation of the hydraulic pump 55 in order to compensate for the shortage of the braking force of the brake system 5 during an idle stop or restart of the engine 3, and is executed at predetermined time intervals.

In the present process, first, in a step 21, it is determined whether or not the idle-stop flag F_IDLSTP or the restart flag F_RESTART is equal to 1. If the answer to the question of the step 21 is negative (NO), i.e. if the engine 3 is neither in idle stop nor being restarted, the present process is immediately terminated.

If the answer to the question of the step 21 is affirmative (YES), i.e. if the engine 3 is either in idle stop or being restarted, a slope ASLP of the road surface on which the vehicle V is stopped at the time is calculated (step 22). The calculation of the road surface slope ASLP is performed based on the forward-rearward acceleration GFR detected by the acceleration sensor 67.

Figure 7:
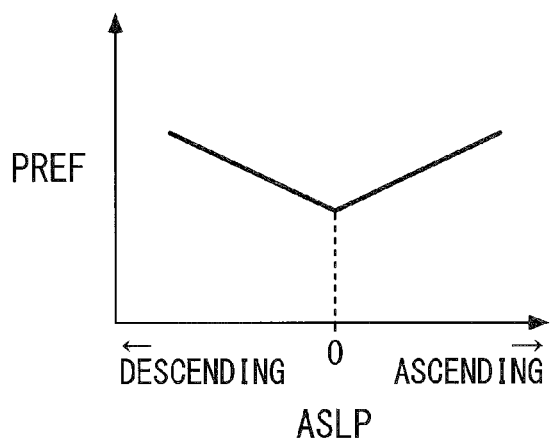
FIG. 7 A map for use in a predetermined pressure setting process performed in the FIG. 6 process.

Next, by searching a map shown in FIG. 7 according to the calculated road surface slope ASLP, a predetermined pressure PREF is calculated (step 23). In this map, the predetermined pressure PREF is set to the minimum value when the road surface slope ASLP is equal to 0, which means the road surface is level, and is set to a higher value as the slope is larger in both the cases of ascending slope and descending slope.

Next, it is determined whether or not the detected wheel cylinder pressure PWC is higher than the set predetermined pressure PREF (step 24). If the answer to the question of the step 24 is negative (NO), i.e. PWC≤PREF, the wheel cylinder pressure PWC is insufficient, so that it is determined that the braking force of the vehicle V needs to be increased, and to indicate this fact, a braking force-increasing request flag F_BFREQ is set to 1 (step 25), followed by terminating the present process.

If the answer to the question of the step 24 is affirmative (YES), it is determined whether or not the vehicle speed VP is approximately equal to 0 (step 26). If the answer to the question of the step 26 is negative (NO), it means that the vehicle V is actually moving even slightly, it is determined that the braking force of the vehicle V needs to be increased to prevent the vehicle V from moving further, so that the process proceeds to the step 25 to set the braking force-increasing request flag F_BFREQ to 1.

On the other hand, if the answer to the question of the step 26 is affirmative (YES), i.e. if "the wheel cylinder pressure PWC>the predetermined pressure PREF" is satisfied and at the same time the vehicle speed VP is approximately equal to 0, it is determined that the braking force of the vehicle V does not need to be increased, so that the braking force-increasing request flag F_BFREQ is set to 0 (step 27), followed by terminating the present process.

Next, a braking force control process for the vehicle V according to a first embodiment will be described with reference to FIG. 8. This process controls the braking force of the vehicle V during an idle stop and restart of the engine 3 according to the cranking state and the result of the braking force-increasing necessity determination obtained from the FIG. 6 process, and is executed at predetermined time intervals.

In the present process, first, in a step 31, it is determined whether or not the idle stop flag F_IDLSTP is equal to 1. If the answer to the question of the step 31 is affirmative (YES), i.e. the engine 3 is in idle stop, the brake system 5 is controlled to the above-mentioned retention mode to retain the braking force of the vehicle V (step 33), followed by terminating the present process.

On the other hand, if the answer to the question of the step 31 is negative (NO), it is determined whether or not the braking force-increasing request flag F_BFREQ is equal to 1 (step 34). If the answer to the question of the step 34 is negative (NO), i.e. if it is determined that the braking force does not need to be increased, the present process is immediately terminated.

If the answer to the question of the step 34 is affirmative (YES), i.e. if it is determined that the braking force of the vehicle V needs to be increased, it is determined whether or not a restart flag F_RESTART is equal to 1 (step 35). If the answer to the question of the step 35 is affirmative (YES), i.e. the engine 3 is being restarted, it is determined whether or not the cranking time period TMCRK is not less than a predetermined time period TREF1 that is less than the predetermined time period TREF3 (step 36).

If the answer to the question of the step 36 is negative (NO), the operation of the hydraulic pump 55 is inhibited (step 37), followed by terminating the present process. That is, in a case where the braking force of the vehicle V needs to be increased, if the first predetermined time period TREF1 has not elapsed after starting the cranking, the operation of the hydraulic pump 55 is inhibited to continue the cranking.

On the other hand, if the answer to the question of the step 36 is affirmative (YES), i.e. if the first predetermined time period TREF1 has elapsed after starting the cranking, it is determined whether or not a hydraulic pump operation flag FBR1 is equal to 1 (step 38). If the answer to the question of the step 38 is negative (NO), i.e. if the hydraulic pump 55 has not been activated yet, the hydraulic pump operation flag F_BR1 is set to 1 (step 39), and a pump operation time period TMBR1 that is counted with a timer of an up-count type is reset to 0 (step 40), whereafter the hydraulic motor 56 is driven to thereby start the operation of the hydraulic pump 55 (step 41), followed by terminating the present process.

By thus operating the hydraulic pump 55 and controlling the hydraulic circuit 13 of the brake system 5 to the above-described pressurization mode, the brake fluid pressure pressurized by the hydraulic pump 55 is supplied to the wheel cylinder 16 via the hydraulic circuit 13, whereby the brake fluid pressure within the wheel cylinder 16 is increased to increase the braking force of the vehicle V.

The answer to the question of the step 38 is affirmative (YES), i.e. if the hydraulic pump 55 has already been activated, it is determined whether or not the pump operation time period TMBR1 is not less than a predetermined time period TBRREF (step 42). If the answer to the question of the step 42 is negative (NO), the process proceeds to the step 41 to continue the operation of the hydraulic pump 55. On the other hand, if the answer to the question of the step 42 is affirmative (YES), i.e. if the predetermined time period TBRREF has elapsed after start of the operation of the hydraulic pump 55, the hydraulic pump 55 is stopped (step 43), followed by terminating the present process.

On the other hand, if the answer to the question of the step 35 is negative (NO), i.e. if the cranking is terminated with an excellent start-up of the engine 3 and the restart thereof is completed in a state where it is determined that the braking force of the vehicle V needs to be increased, it is determined whether or not the restart flag F_RESTART is equal to 1 (step 45). If the answer to the question of the step 45 is negative (YES), i.e. if the present loop corresponds to a loop immediately after completion of restart of the engine 3, similarly to the steps 39 to 41, the hydraulic pump operation flag F_BR1 is set to 1 (step 46) and the pump operation time period TMBR1 is reset to 0 (step 47), whereafter the operation of the hydraulic pump 55 is started (step 48), followed by terminating the present process.

Further, if the answer to the question of the step 45 is negative (NO), i.e. after the operation of the hydraulic pump 55 is started, similarly to the steps 42, it is determined whether or not the pump operation time period TMBR1 is not less than the predetermined time period TBRREF (step 49). If the answer to the question of the step 49 is negative (NO), the process proceeds to the step 48 to continue the operation of the hydraulic pump 55, whereas if the answer to the question thereof is affirmative (YES), i.e. if the predetermined time period TBRREF elapsed after starting the operation of the hydraulic pump 55, the operation of the hydraulic pump 55 is stopped (step 50), followed by terminating the present process.

Figure 9:
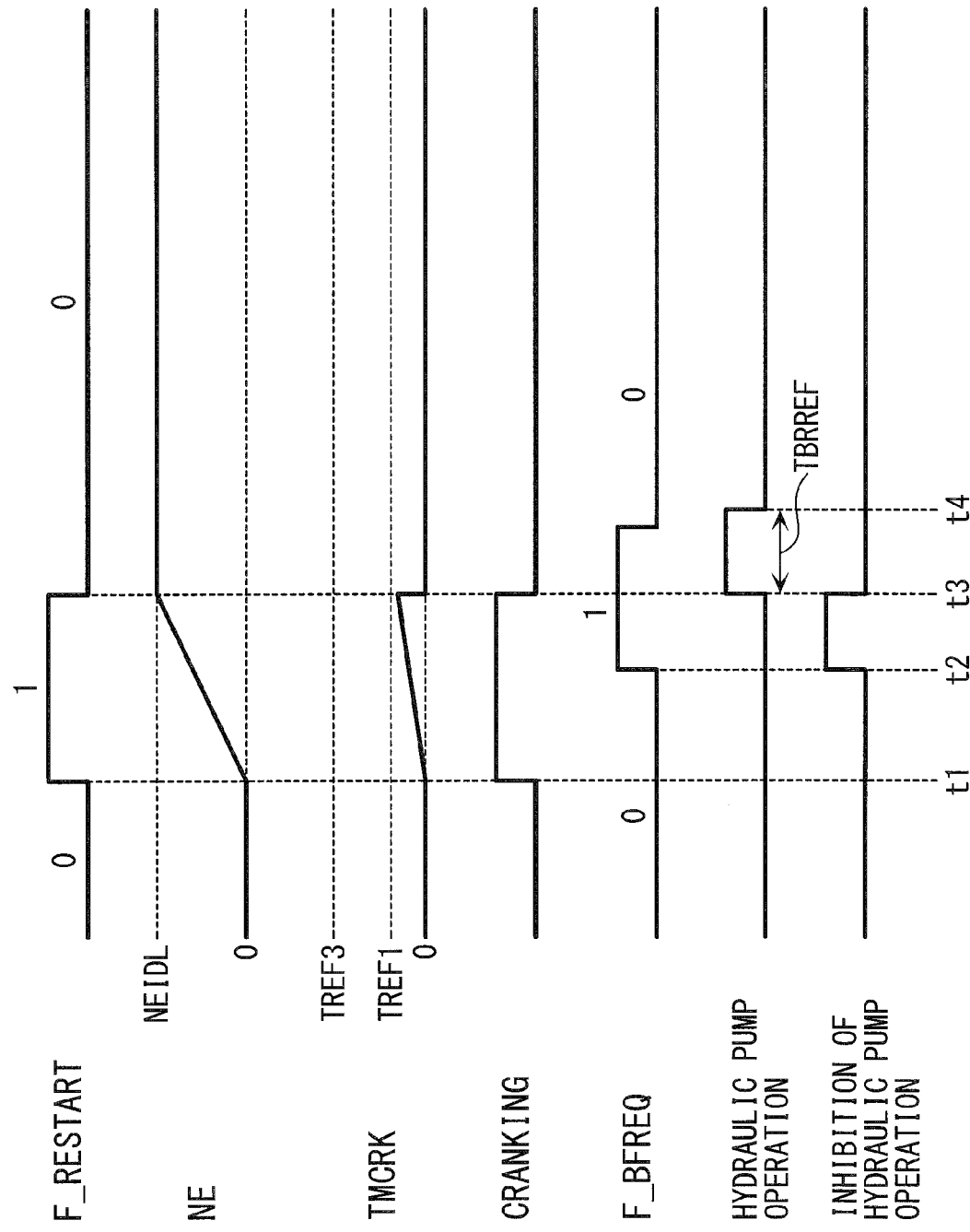
FIG. 9 A timing diagram showing an operation example obtained by the FIG. 8 process.
Figure 10:
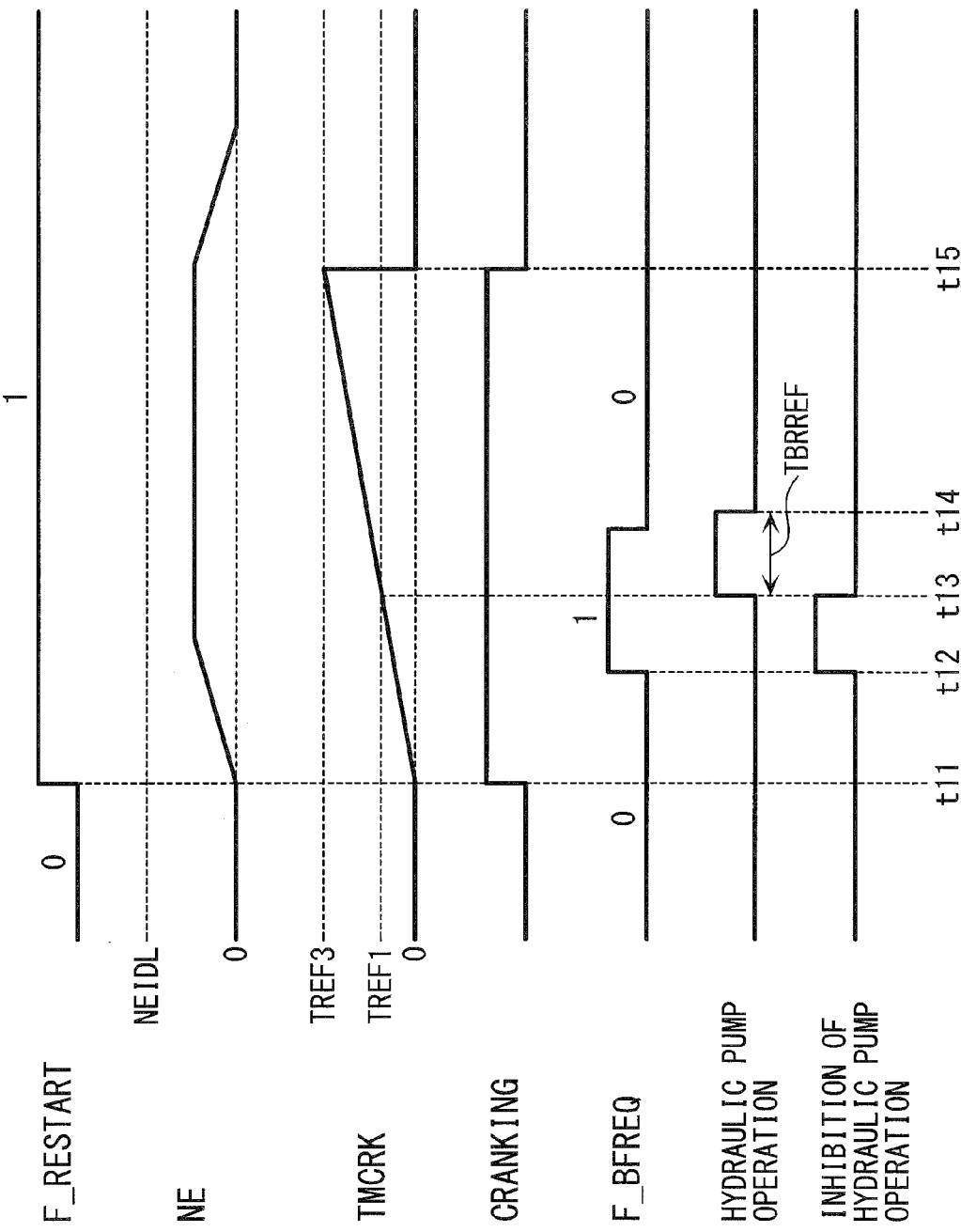
FIG. 10 A timing diagram showing an operation example which is obtained by the FIG. 8 process and is different from the FIG. 9 example.

FIGS. 9 and 10 show two operation examples obtained by the processes described heretofore. FIG. 9 shows an example in which the cranking is terminated with an excellent start-up of the engine 3 and the restart operation is completed. If the restart conditions of the engine 3 are satisfied during an idle stop (time point t1), the restart flag F_RESTART is set to 1 (step 6 in FIG. 5), and simultaneously therewith the cranking is started (step 8).

Further, at a time point t2 during cranking, if it is determined that the braking force of the vehicle V needs to be increased, in accordance therewith, the braking force-increasing request flag F_BFREQ is set to 1. However, at this point, the operation of the hydraulic pump 55 is inhibited (steps 36, 37 in FIG. 8). Thereafter, when the engine speed NE reaches the idle engine speed NEIDL (time point t3), at this time point, the cranking is terminated (steps 10, 12, 13 in FIG. 5), and the inhibition of the operation of the hydraulic pump 55 is cancelled to start the operation of the hydraulic pump 55 (step 48 in FIG. 8). Then, the hydraulic pump 55 is stopped at a time point t4 when the predetermined time period TBRREF has elapsed after starting the operation of the hydraulic pump 55 (steps 49, 50).

FIG. 10 shows an example in which the cranking is terminated without the engine 3 being excellently started up. Similarly to the example in FIG. 9, if the restart conditions are satisfied during an idle stop (time point t11), the restart flag F_RESTART is set to 1, and simultaneously therewith the cranking is started. Further, during cranking, if it is determined that the braking force of the vehicle V needs to be increased (time point t12), in accordance therewith, the braking force-increasing request flag F_BFREQ is set to 1 (time point t12). However, the operation of the hydraulic pump 55 is inhibited (steps 36, 37 in FIG. 8).

Then, at a time point t13 when the cranking time period TMCRK reaches the first predetermined time period TREF1, the inhibition of the operation of the hydraulic pump 55 is cancelled to start the operation of the hydraulic pump 55 (steps 36, 41). Then, the hydraulic pump 55 is stopped at a time point t14 when the predetermined time period TBRREF has elapsed (steps 42, 43). Further, in this example, since the cranking time period TMCRK reaches the third predetermined time period TREF3 without the engine speed NE rising to the idle engine speed NEIDL, the cranking is terminated at the time point t15.

As described above, according to the present embodiment, if the restart conditions are satisfied during an idle stop, simultaneously therewith, the cranking is started, and during this cranking, if it is determined that the braking force of the vehicle V needs to be increased, the operation of the hydraulic pump 55 is inhibited. This makes it possible to prevent the battery voltage VB from being lowered due to the operation of the hydraulic pump 55 and secure a battery voltage VB required for the cranking, and hence it is possible to stably and excellently perform the cranking and restart operations.

Further, as shown in FIG. 9, in a case where the cranking is terminated with an excellent start-up of the engine 3, the inhibition of the operation of the hydraulic pump 55 is cancelled at the end of the cranking and the hydraulic pump 55 is caused to operate. This makes it possible to properly increase the braking force of the vehicle V while avoiding malfunction or failure of the hydraulic pump 55 which might be caused by shortage of power in a state where the battery voltage VB is lowered due to the cranking, and hence it is possible to positively prevent the vehicle V from moving during an idle stop.

On the other hand, as shown in FIG. 10, in a case where the cranking is terminated without the engine 3 being excellently started up, at the time point when the cranking time period TMCRK reaches the first predetermined time period TREF1, the inhibition of the operation of the hydraulic pump 55 is cancelled to cause the same to operate. This makes it possible to increase the braking force of the vehicle V as quickly as possible, and positively prevent the vehicle V from moving during an idle stop.

Further, in both the cases of FIG. 9 and FIG. 10, since the hydraulic pump 55 is stopped when the predetermined time period TBRREF has elapsed after starting the operation of the hydraulic pump 55, the operation time period thereof is sufficiently secured, which makes it possible to positively increase the braking force of the vehicle V.

Further, although in the embodiment, the above-described predetermined time period TBRREF is a fixed value, the predetermined time period TBRREF may be set according to the calculated road surface slope ASLP. In this case, e.g. similarly to the case of the predetermined pressure PREF shown in FIG. 7, the predetermined time period TBRREF is set to the minimum value when the road surface slope ASLP is equal to 0, i.e. the road surface is level, and is set to a larger value as the slope is larger. This makes it possible to further properly increase the braking force of the vehicle V by operating the hydraulic pump 55 for a longer time period as the mobility of the vehicle V is higher due to the influence of the road surface slope.

Further, since the hydraulic pump 55 is activated only in a case where it is determined that the braking force of the vehicle V needs to be increased, differently from the conventional system, it is possible to perform an efficient operation of the hydraulic pump 55 without wasting power, which in turn makes it possible to improve the fuel economy of the vehicle V.

Figure 6:
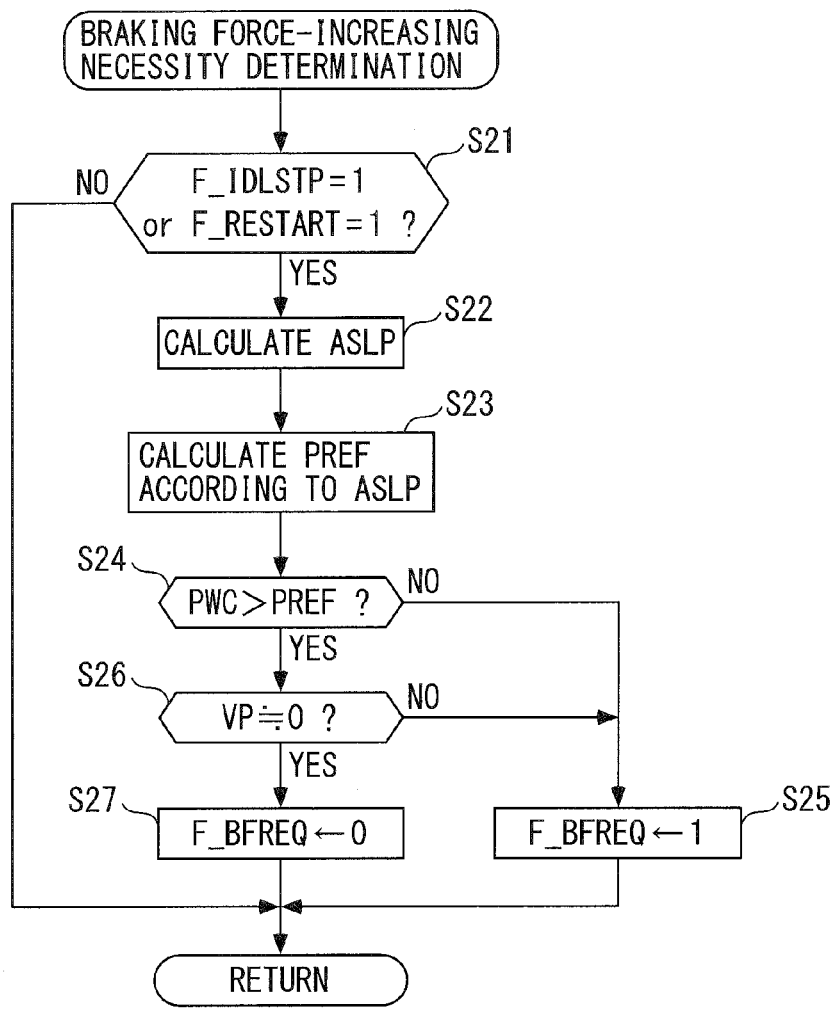
FIG. 6 A flowchart of a braking force-increasing necessity determination process for a vehicle.

Further, in the determination process in FIG. 6, it is determined that the braking force of the vehicle V needs to be increased by the hydraulic pump 55 when the wheel cylinder pressure PWC is lowered to not higher than the predetermined pressure PREF or when the vehicle speed VP is not equal to 0. Therefore, it is possible to properly obtain the required braking force by operating the hydraulic pump 55 according to a lowered state of the actual wheel cylinder pressure PWC and a moving state of the vehicle V. Further, since the above-described predetermined pressure PREF is set according to the road surface slope ASLP, it is possible to properly operate the hydraulic pump 55 and efficiently obtain the required braking force according to the mobility of the vehicle V.

Figure 11:
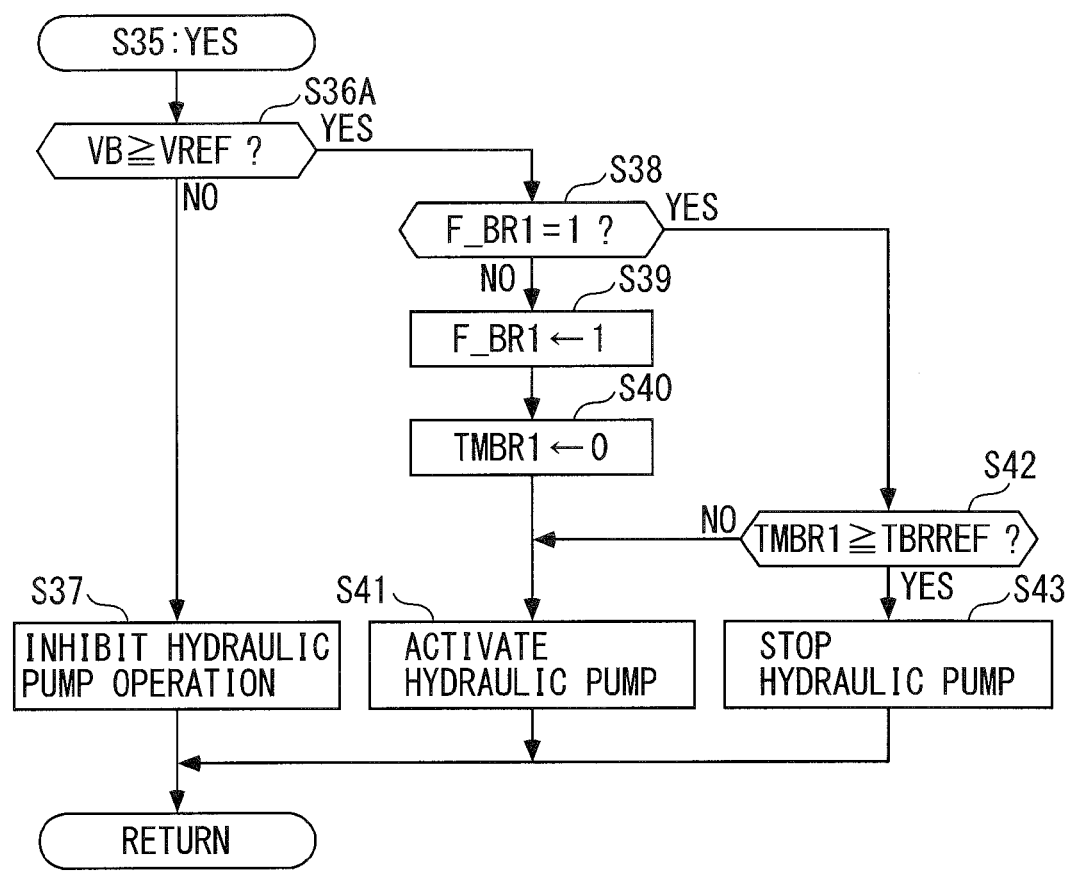
FIG. 11 A flowchart showing part of a braking force control process according to a variation of the first embodiment.

Next, a braking force control process for the vehicle V according to a variation of the first embodiment will be described with reference to FIG. 11. FIG. 11 shows only part corresponding to the steps 36 to 43 (hereinafter referred to as "the braking force control during cranking") of the control process according to the first embodiment shown in FIG. 8, and processing operations in the steps omitted from illustration are substantially the same as those in FIG. 8.

Figure 8:
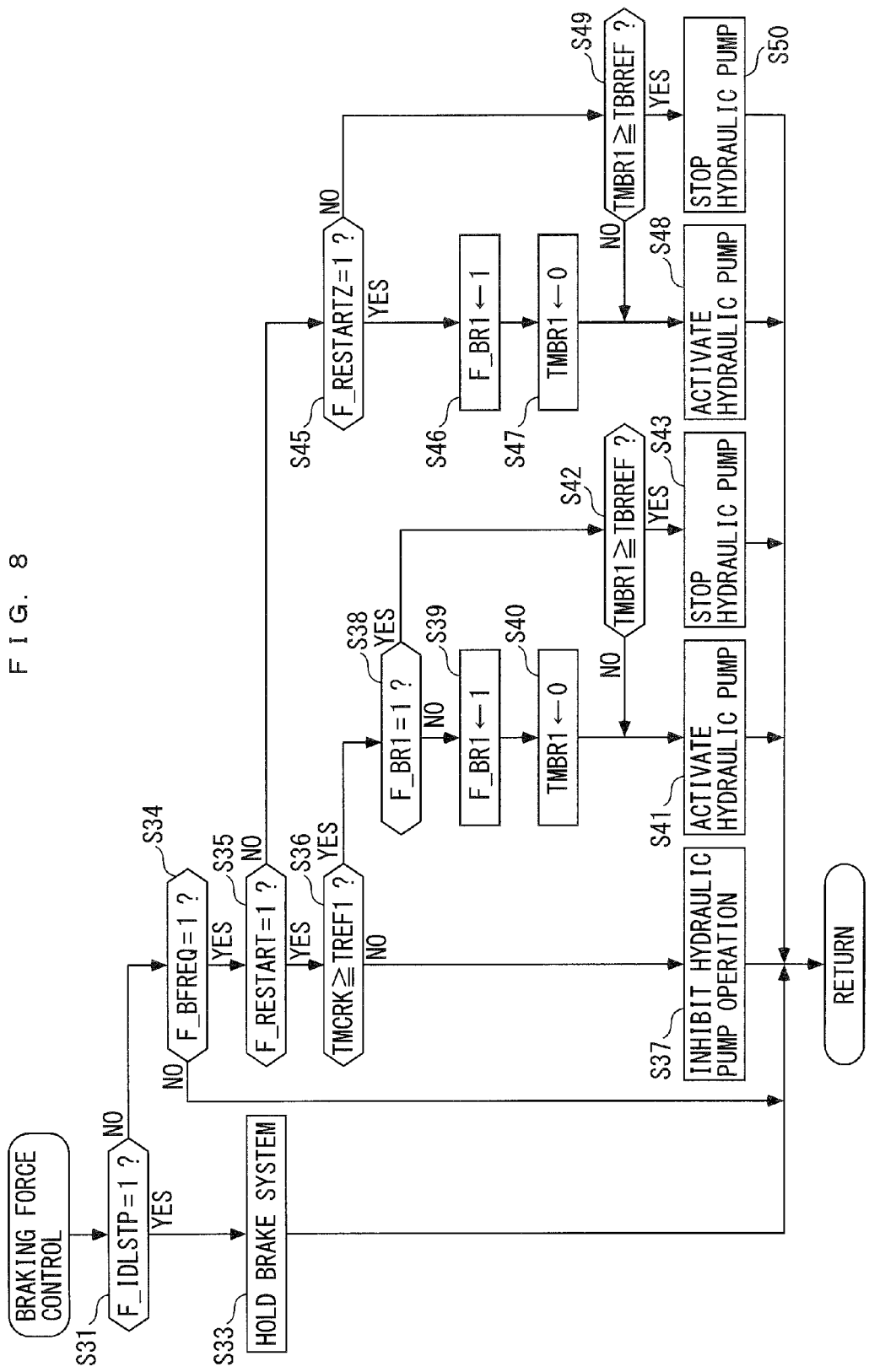
FIG. 8 A flowchart of a braking force control process according to a first embodiment.

As is apparent from a comparison with FIG. 8, this variation is distinguished from FIG. 8 only by a step 36A corresponding to the step 36 in FIG. 8, wherein the battery voltage VB is used as a reference for determining timing of starting the operation of the hydraulic pump 55 during cranking, instead of the cranking time period TMCRK in the first embodiment.

More specifically, if the answer to the question of the step 35 is affirmative (YES), i.e. during cranking, it is determined in the step 36A whether or not the detected battery voltage VB is not lower than a predetermined voltage VREF. If the answer to the question of the step 36A is negative (NO), i.e. if the battery voltage VB is lower than the predetermined voltage VREF, the operation of the hydraulic pump 55 is inhibited (step 37), whereas if the battery voltage VB becomes not lower than the predetermined voltage VREF, the steps 38 to 43 are performed, whereby the hydraulic pump 55 is activated and stopped in the very same manner as in the first embodiment.

Figure 12:
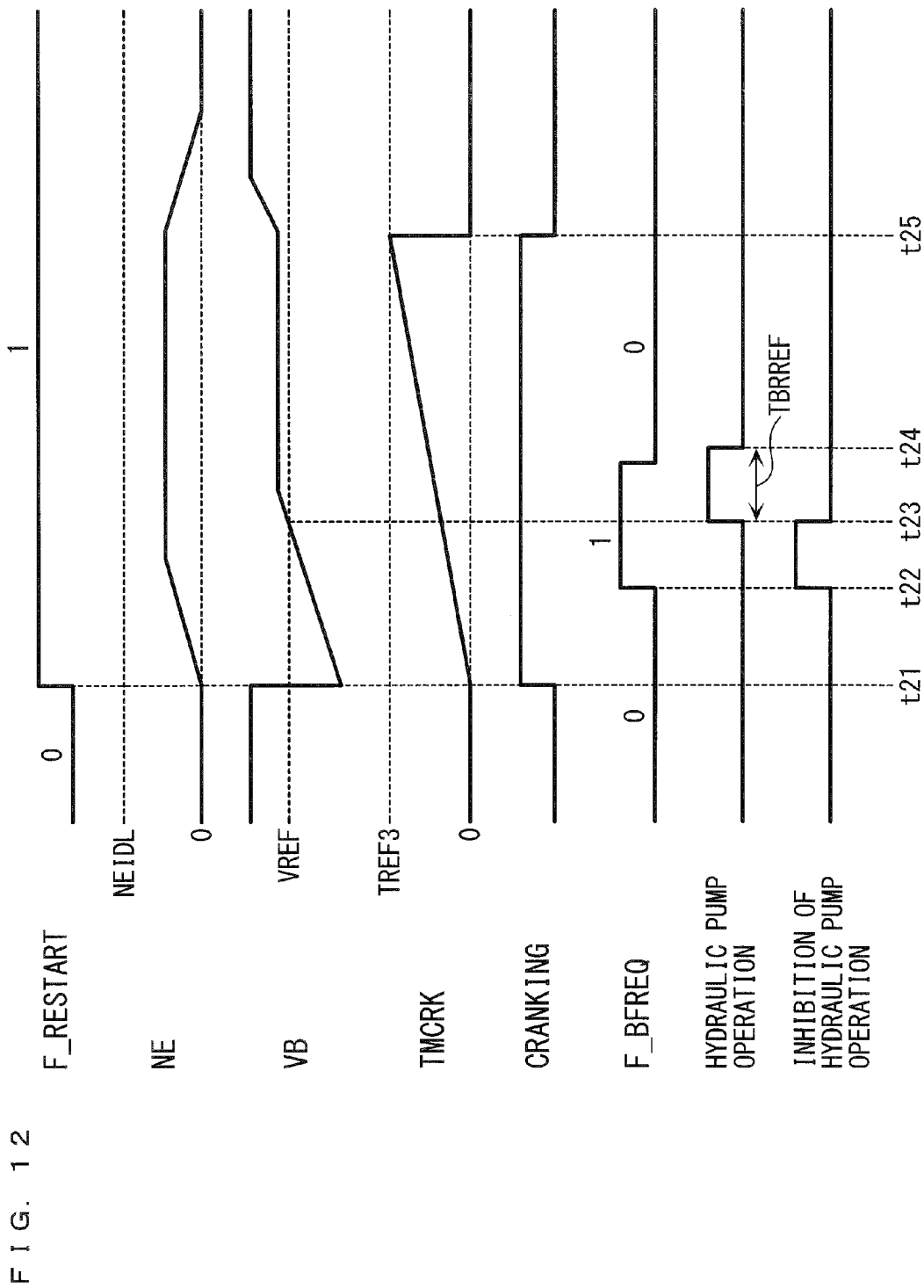
FIG. 12 A timing diagram showing an operation example obtained by the FIG. 11 process.

Therefore, according to this variation, as shown in FIG. 12, when the restart conditions are satisfied during an idle stop (time point t21), simultaneously therewith, the cranking is started, and when it is determined that the braking force of the vehicle V needs to be increased (F_BFREQ=1) during cranking (time point t22), the operation of the hydraulic pump 55 is inhibited until the battery voltage VB becomes equal to the predetermined voltage VREF. This makes it possible to stably perform the cranking and restart operations while preventing the battery voltage VB from being lowered due to the operation of the hydraulic pump 55.

Then, when the battery voltage VB has risen to the predetermined voltage VREF (time point t23), the operation of the hydraulic pump 55 is started, and hence it is possible to excellently operate the hydraulic pump 55 in a state where the battery voltage VB is actually and sufficiently recovered. Then, the hydraulic pump 55 is stopped at a time point t24 when the predetermined time period TBRREF has elapsed.

Further, although in the above-described first embodiment and the variation thereof, the hydraulic pump 55 is used as a braking force-increasing device for increasing the braking force of the vehicle V, the electric brake 20 may be used instead of this. In this case, it is possible to obtain the same advantageous effects as described above by controlling the activation and stop of the electric brake 20 in the same manner as in the above-described case of the hydraulic pump 55.

Figure 13:
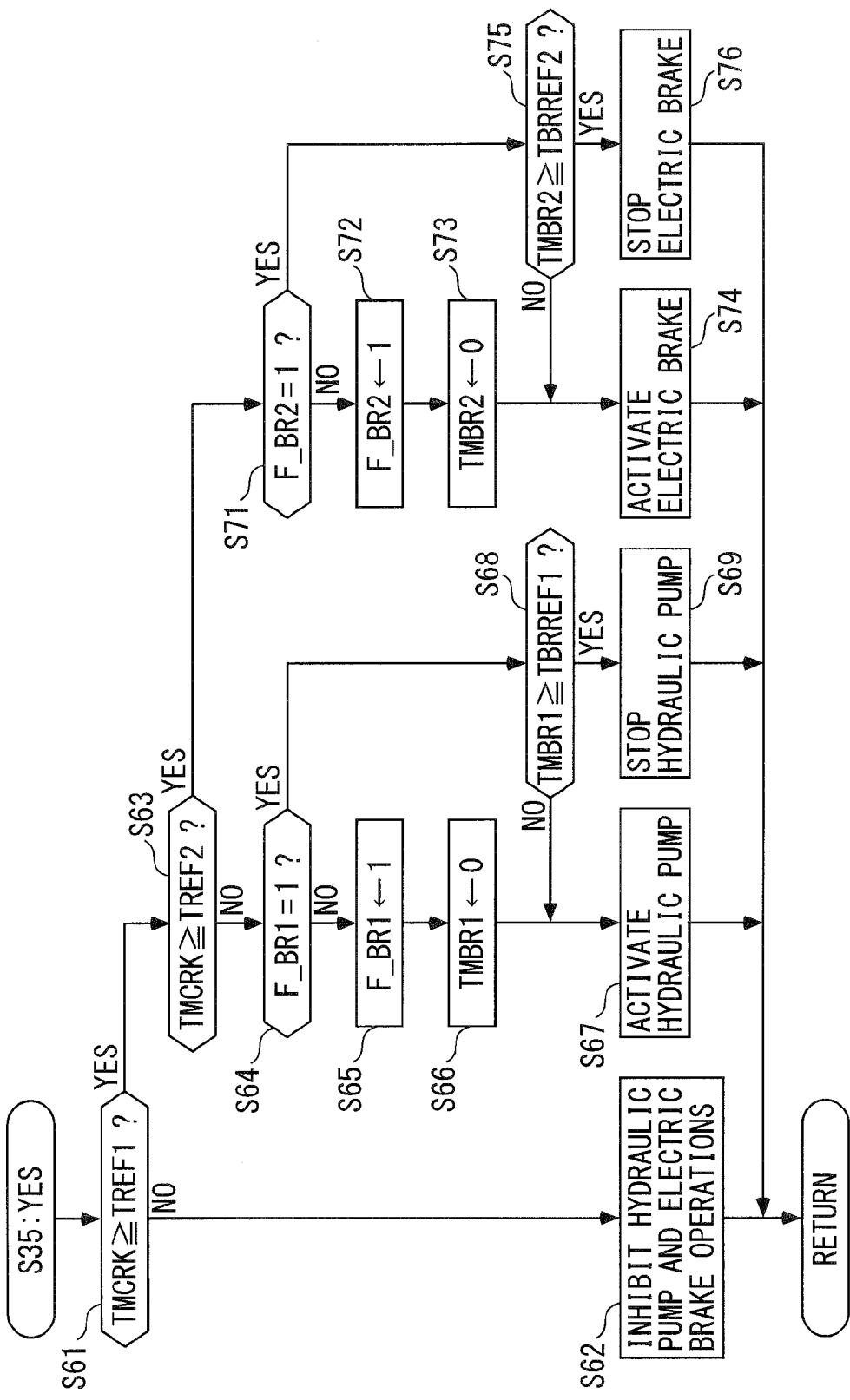
FIG. 13 A flowchart showing part of a braking force control process according to a second embodiment.

Next, a braking force control process for the vehicle V according to a second embodiment will be described with reference to FIG. 13. FIG. 13 also shows only part corresponding to the braking force control during cranking of the control process according to the first embodiment shown in FIG. 8, and processing operations in the steps omitted from illustration are substantially the same as those in FIG. 8. The present embodiment is different from the first embodiment in that in the braking force control during cranking, not only the electric brake 20 but also the hydraulic pump 55 is used as the braking force-increasing device.

In this process, if the answer to the question of the step 35 is affirmative (YES), i.e. if during cranking, it is determined whether or not the cranking time period TMCRK is not less than the first predetermined time period TREF1 (step 61). If the answer to the question of the step 61 is negative (NO), the operations of the hydraulic pump 55 and the electric brake 20 are inhibited (step 62), followed by terminating the present process.

If the answer to the question of the step 61 is affirmative (YES), i.e. if the cranking time period TMCRK has reached the first predetermined time period TREF1, it is determined whether or not the cranking time period TMCRK is not less than a second predetermined time period TREF2 that is between the first predetermined time period TREF1 and the third predetermined time period TREF3 (step 63). If the answer to the question of the step 63 is negative (NO), i.e. TREF1≤TMCRK<TREF2, it is determined whether or not the hydraulic pump operation flag F_BR1 is equal to 1 (step 64).

If the answer to the question of the step 64 is negative (NO), i.e. if the hydraulic pump 55 has not been activated yet, the hydraulic pump operation flag FBR1 is set to 1 (step 65), and the pump operation time period TMBR1 is reset to 0 (step 66), whereafter the operation of the hydraulic pump 55 is started by driving the hydraulic motor 56 (step 67), followed by terminating the present process. The brake fluid pressure in the wheel cylinder 16 is increased by this operation of the hydraulic pump 55, whereby the braking force of the vehicle V is increased.

If the answer to the question of the step 64 is affirmative (YES), i.e. if the hydraulic pump 55 has already been activated, it is determined whether or not the pump operation time period TMBR1 is not less than a predetermined time period TBRREF1 (step 68). If the answer to the question of the step 68 is negative (NO), the process proceeds to the step 67 to continue the operation of the hydraulic pump 55. On the other hand, if the answer to the question of the step 68 is affirmative (YES), i.e. if the predetermined time period TBRREF1 has elapsed after starting the operation of the hydraulic pump 55, the hydraulic pump 55 is stopped (step 69), followed by terminating the present process.

If the answer to the question of the step 63 is affirmative (YES), i.e. if the cranking time period TMCRK has reached the second predetermined time period TREF2, it is determined whether or not an electric brake operation flag FBR2 is equal to 1 (step 71). If the answer to the question of the step 71 is negative (NO), i.e. if the electric brake 20 has not been activated yet, the electric brake operation flag F_BR2 is set to 1 (step 72), and a brake operation time period TMBR2 that is counted with a timer is reset to 0 (step 73), whereafter the operation of the electric brake 20 is started by driving the brake motor 25 (step 74), followed by terminating the present process. The braking force of the vehicle V is further increased by this operation of the electric brake 20.

If the answer to the question of the step 71 is affirmative (YES), i.e. if the electric brake 20 has already been activated, it is determined whether or not the brake operation time period TMBR2 is not less than a predetermined time period TBRREF2 (step 75). If the answer to the question of the step 75 is negative (NO), the process proceeds to the step 74 to continue the operation of the electric brake 20. On the other hand, if the answer to the question of the step 75 is affirmative (YES), i.e. if the predetermined time period TBRREF2 has elapsed after starting the operation of the electric brake 20, the electric brake 20 is stopped (step 76), followed by terminating the present process.

Figure 14:
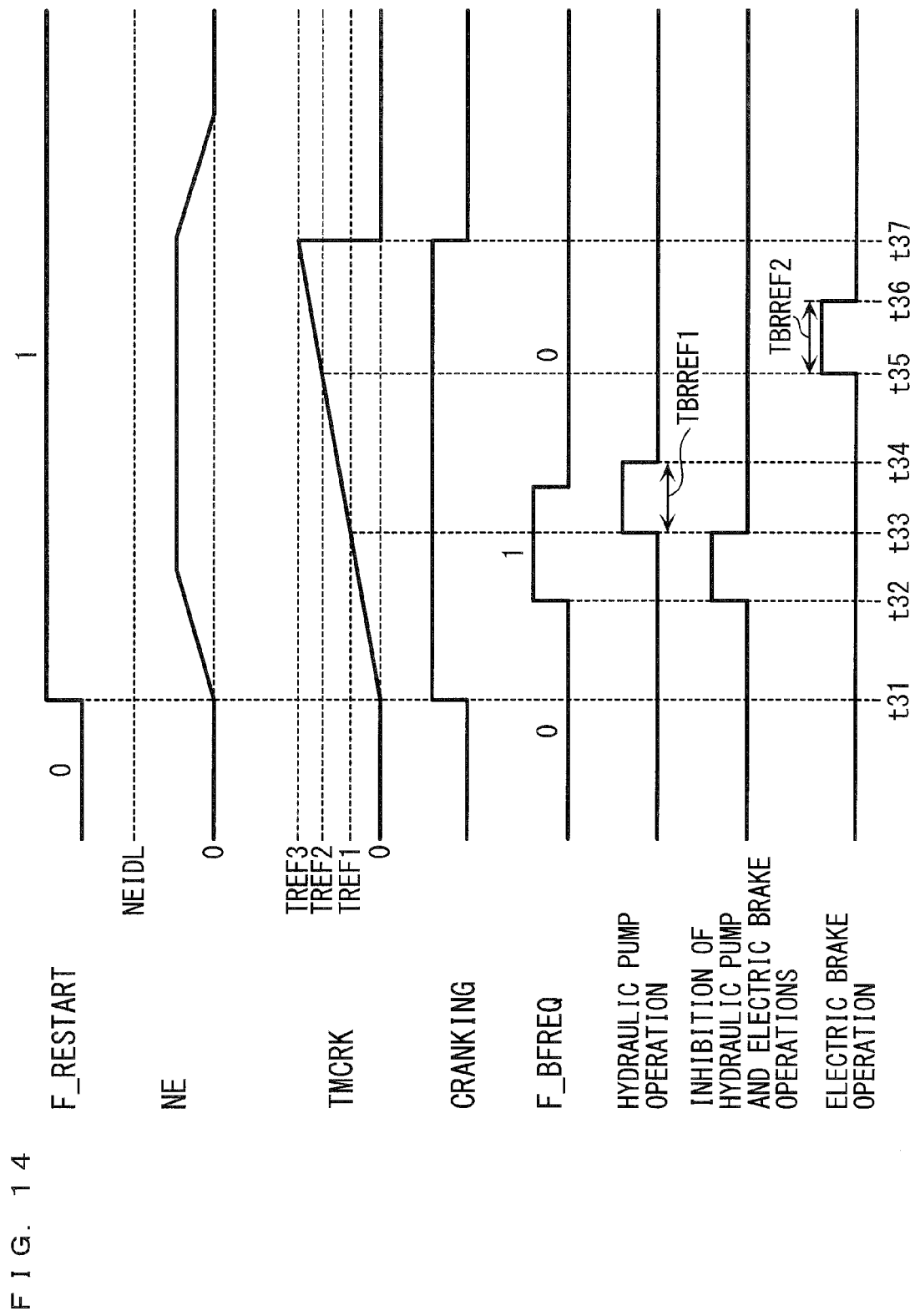
FIG. 14 A timing diagram showing an operation example obtained by the FIG. 13 process.

FIG. 14 shows an operation example obtained by the control process according to the above-described second embodiment, in a case where similarly to FIG. 10, the cranking is terminated without the engine 3 being excellently started up. If the restart conditions are satisfied during an idle stop (time point t31), simultaneously therewith, the cranking is started. Further, during this cranking, if it is determined that the braking force of the vehicle V needs to be increased (time point t32), the operations of the hydraulic pump 55 and the electric brake 20 are inhibited (step 62), and thereafter, at a time point t33 when the cranking time period TMCRK reaches the first predetermined time period TREF1, the operation of the hydraulic pump 55 is started (step 67).

Thereafter, at a time point t34 when the predetermined time period TBRREF1 has elapsed, the hydraulic pump 55 is stopped (step 69). Further, at a time point t35 when the cranking time period TMCRK reaches the second predetermined time period TREF2, the operation of the electric brake 20 is started (step 74), and thereafter, at a time point t36 when the predetermined time period TBRREF2 has elapsed, the electric brake 20 is stopped (step 76).

As described above, according to the present embodiment, if the restart conditions are satisfied during an idle stop, simultaneously therewith, the cranking is started, and if it is determined during the cranking that the braking force of the vehicle V needs to be increased, the operations of the hydraulic pump 55 and the electric brake 20 are inhibited. Therefore, similarly to the first embodiment, it is possible to prevent the battery voltage VB from being lowered due to the operations of the hydraulic pump 55 and the electric brake 20, and stably and excellently perform the cranking and restart operations by securing the battery voltage VB required for the cranking.

Further, after starting the cranking, when the first predetermined time period TBRREF1 has elapsed, first, the hydraulic pump 55 is activated, and thereafter when the second predetermined time period TBRREF2 has elapsed after starting the cranking, the electric brake 20 is activated. The operations of the hydraulic pump 55 and the electric brake 20 are thus sequentially started to increase the braking force of the vehicle V in a stepwise manner, and hence it is possible to efficiently and strongly brake the vehicle V, and positively prevent the vehicle V from moving during an idle stop. Further, since the hydraulic pump 55 is activated first which has a higher responsiveness to power supply to the motor for generating the braking force, it is possible to more positively prevent the vehicle V from moving during an idle stop by more quickly increasing the braking force of the vehicle V.

Figure 15:
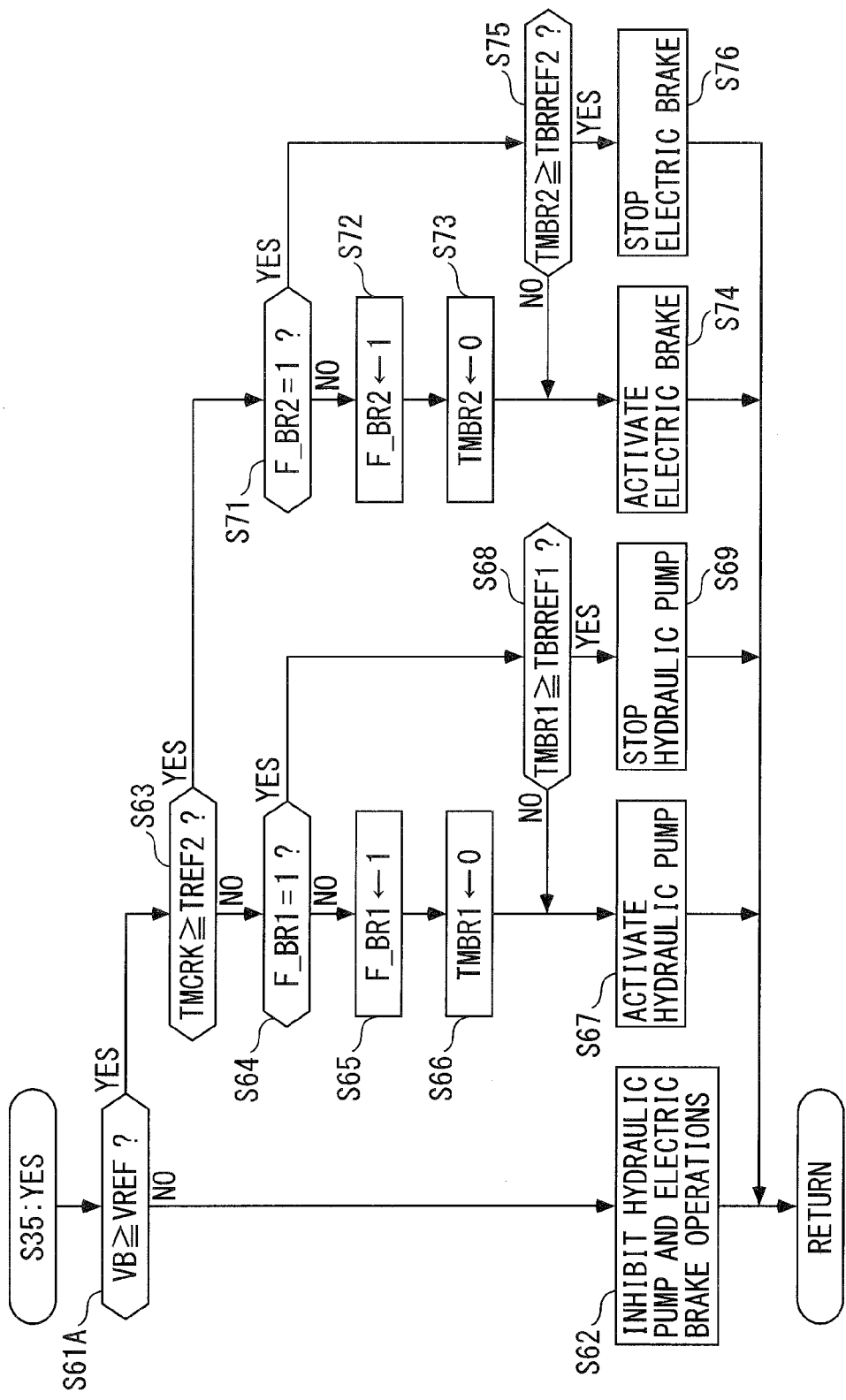
FIG. 15 A flowchart showing part of a braking force control process according to a variation of the second embodiment.

Next, a braking force control process for the vehicle V according to a variation of the second embodiment will be described with reference to FIG. 15. As is apparent from a comparison with FIG. 13, this variation is distinguished from FIG. 13 only by a step 61A corresponding to the step 61 in FIG. 13, wherein the battery voltage VB is used as a reference for determining timing of starting the operation of the hydraulic pump 55 during cranking, instead of the cranking time period TMCRK, and processing operations in the other steps are quite the same as in FIG. 13.

More specifically, if the answer to the question of the step 35 is affirmative (YES), i.e. during cranking, it is determined in the step 61A whether or not the battery voltage VB is not lower than a predetermined voltage VREF. If the answer to the question of the step 61A is negative (NO), i.e. if the battery voltage VB is lower than the predetermined voltage VREF, the operations of the hydraulic pump 55 and the electric brake 20 are inhibited (step 62). On the other hand, if the battery voltage VB becomes not lower than the predetermined voltage VREF, the process proceeds to the steps 63 et seq., whereby the hydraulic pump 55 and the electric brake 20 are activated and stopped in the very same manner as in the second embodiment.

Therefore, according to this variation, as shown in FIG. 16, when the restart conditions are satisfied during an idle stop (time point t41), simultaneously therewith, the cranking is started. Further, when it is determined that the braking force of the vehicle V needs to be increased (F_BFREQ=1) during this cranking (time point t42), the operations of the hydraulic pump 55 and the electric brake 20 are inhibited until the battery voltage VB becomes equal to the predetermined voltage VREF. Then, when the battery voltage VB has risen to the predetermined voltage VREF (time point t43), the operation of the hydraulic pump 55 is started. This makes it possible to excellently operate the hydraulic pump 55 in a state where the battery voltage VB is actually and sufficiently recovered.

Further, although in the above-described second embodiment and the variation thereof, when increasing the braking force of the vehicle V, the operations of the hydraulic pump 55 and the electric brake 20 are sequentially started in the mentioned order, this order may be reversed. Even in the reversed order, it is possible to obtain the same advantageous effects as described above.

Note that the present invention is not limited to the above-described embodiments, but can be practiced in various forms. For example, although in the embodiments, the hydraulic pump 55 is stopped when the predetermined time period TBRREF or TBRREF1 has elapsed after starting the operation of the hydraulic pump 55, instead of this, the hydraulic pump 55 may be stopped when the detected wheel cylinder pressure PWC exceeds the predetermined pressure PREF. This makes it possible to stop the hydraulic pump 55 in a state where the wheel cylinder pressure PWC has been actually and sufficiently recovered. Therefore, it is possible to positively increase the braking force of the vehicle V, and efficiently operate the hydraulic pump 55.

Further, although in the embodiments, each wheel W of the vehicle V is provided with the disc brake 14, with regard to the rear wheels WRL and WRR, instead of the disc brake, a drum brake may be used, and in this case, with regard to the electric brake as well, one for drum brake may be used.

Further, although in the embodiments, the present invention is applied to the gasoline engine installed on the vehicle, this is not limitative, but it can be applied to various engines other than the gasoline engine, e.g. a diesel engine, and further, it is possible to change details of the configuration of the embodiment within the spirit and scope of the present invention.

INDUSTRIAL APPLICABILITY

The stop control system for a vehicle according to the present invention stably performs the cranking to restart the internal combustion engine during an idle stop, and properly increases the braking force of the vehicle, which is very useful in positively preventing the vehicle from moving.

REFERENCE SIGNS LIST

2 ECU (braking force increasing necessity-determining means, control means, cranking time period-acquiring means, predetermined time period-setting means, predetermined pressure-setting means)
3 internal combustion engine
5 brake system
6 starter motor (cranking means)
7 battery (power source)
16 wheel cylinder
20 electric brake (braking force-increasing device, second braking force-increasing device)
55 hydraulic pump (braking force-increasing device, first braking force-increasing device)
62 wheel cylinder pressure sensor (wheel cylinder pressure-detecting means)
64 wheel speed sensor (vehicle speed-detecting means)
67 acceleration sensor (road surface slope-detecting means)

68 voltage sensor (voltage acquisition means)
V vehicle
TMCRK cranking time period
TREF1 first predetermined time period
TREF2 second predetermined time period
TBRREF predetermined time period
VB battery voltage (voltage of the power source)
VREF predetermined voltage
PWC wheel cylinder pressure (brake fluid pressure in the wheel cylinder)
PREF predetermined pressure
ASLP road surface slope (slope of road surface on which the vehicle is stopped)
VP vehicle speed

The invention claimed is:

1. A stop control system for a vehicle, for stopping an internal combustion engine installed on the vehicle having a brake system, when predetermined stop conditions are satisfied, restarting the engine when predetermined restart conditions are satisfied, and controlling a braking force of the vehicle such that the braking force is increased in order to supplement the braking force of the brake system during a stop of the vehicle, comprising:
cranking means for cranking the engine using power supplied from a predetermined power source when the restart conditions are satisfied;
a braking force-increasing device that is driven by power supplied from the power source, for increasing the braking force of the vehicle;
braking force increasing necessity-determining means for determining whether or not the braking force of the vehicle needs to be increased by said braking force-increasing device during a stop of the engine;
control means for controlling said braking force-increasing device according to a determination result by said braking force increasing necessity-determining means; and
cranking time period-acquiring means for acquiring a time period of cranking performed by said cranking means,
wherein said braking force-increasing device includes a first braking force-increasing device and a second braking force-increasing device,
wherein in a case where it is determined that the braking force of the vehicle needs to be increased, said control means inhibits operations of said first braking force-increasing device and said second braking force-increasing device until the acquired time period of cranking reaches a first predetermined time period, causes said first braking force-increasing device to operate while continuing the cranking when the time period of cranking reaches the first predetermined time period, and thereafter, causes said second braking force-increasing device to operate while continuing the cranking when the time period of cranking reaches a second predetermined time period that is more than the first predetermined time period.

2. A stop control system for a vehicle, for stopping an internal combustion engine installed on the vehicle having a brake system, when predetermined stop conditions are satisfied, restarting the engine when predetermined restart conditions are satisfied, and controlling a braking force of the vehicle such that the braking force is increased in order to supplement the braking force of the brake system during a stop of the vehicle, comprising:
cranking means for cranking the engine using power supplied from a predetermined power source when the restart conditions are satisfied;
a braking force-increasing device that is driven by power supplied from the power source, for increasing the braking force of the vehicle;
braking force increasing necessity-determining means for determining whether or not the braking force of the vehicle needs to be increased by said braking force-increasing device during a stop of the engine;
control means for controlling said braking force-increasing device according to a determination result by said braking force increasing necessity-determining means;
voltage acquisition means for acquiring a voltage of the power source; and
cranking time period-acquiring means for acquiring a time period of cranking performed by said cranking means,
wherein said braking force-increasing device includes a first braking force-increasing device and a second braking force-increasing device, and
wherein in a case where it is determined that the braking force of the vehicle needs to be increased, said control means inhibits operations of said first braking force-increasing device and said second braking force-increasing device until the voltage of the power source acquired during the cranking becomes not lower than a predetermined voltage, causes said first braking force-increasing device to operate when the voltage of the power source becomes not lower than the predetermined voltage, and thereafter, causes said second braking force-increasing device to operate when the acquired time period of cranking reaches a predetermined time period.

3. The stop control system according to claim 1, wherein said control means stops said first braking force-increasing device when a third predetermined time period elapses after starting the operation of said first braking force-increasing device, and stops said second braking force-increasing device when a fourth predetermined time period elapses after starting the operation of said second braking force-increasing device.

4. The stop control system according to claim 3, further comprising:
road surface slope-detecting means for detecting a slope of a road surface on which the vehicle is stopped; and
predetermined time period-setting means for setting the third predetermined time period according to the detected slope of the road surface.

5. The stop control system according to claim 1, wherein said first braking force-increasing device has a characteristic that a response time period from supply of power to generation of the braking force is shorter than that of said second braking force-increasing device.

6. The stop control system according to claim 1, wherein the brake system is configured to brake the vehicle by brake fluid pressure that is supplied to a wheel cylinder,
the stop control system further comprising:
wheel cylinder pressure-detecting means for detecting the brake fluid pressure in the wheel cylinder, and
wherein said braking force increasing necessity-determining means determines that the braking force needs to be increased by said braking force-increasing device when the detected brake fluid pressure in the wheel cylinder has lowered to not higher than a predetermined pressure.

7. The stop control system according to claim 6, wherein said control means stops said first braking force-increasing device when the brake fluid pressure in the wheel cylinder exceeds the predetermined pressure after activating said first braking force-increasing device.

8. The stop control system according to claim 6, further comprising:
   road surface slope-detecting means for detecting a slope of a road surface on which the vehicle is stopped; and
   predetermined pressure-setting means for setting the predetermined pressure according to the detected slope of the road surface.

9. The stop control system according to claim 1, further comprising:
   vehicle speed-detecting means for detecting a speed of the vehicle, and
   wherein said braking force increasing necessity-determining means determines that the braking force needs to be increased by said braking force-increasing device, when the detected vehicle speed is not equal to 0.

* * * * *